United States Patent
Clarke et al.

(10) Patent No.: US 12,421,928 B2
(45) Date of Patent: Sep. 23, 2025

(54) MULTIFUNCTIONAL BATTERY BOOSTER

(71) Applicant: Schumacher Electric Corporation, Fort Worth, TX (US)

(72) Inventors: Patrick J. Clarke, St. Charles, IL (US); John S. Whiting, Hampshire, IL (US); Brian F. Butler, Chicago, IL (US)

(73) Assignee: Schumacher Electric Corporation, Fort Worth, TX (US)

( * ) Notice: Subject to any disclaimer, the term of this patent is extended or adjusted under 35 U.S.C. 154(b) by 0 days.

(21) Appl. No.: 18/208,649

(22) Filed: Jun. 12, 2023

(65) Prior Publication Data
US 2023/0323847 A1     Oct. 12, 2023

Related U.S. Application Data

(63) Continuation of application No. 16/556,525, filed on Aug. 30, 2019, now Pat. No. 11,674,490.
(Continued)

(51) Int. Cl.
*F02N 11/08*     (2006.01)
*B60L 53/62*     (2019.01)
(Continued)

(52) U.S. Cl.
CPC .......... *F02N 11/0862* (2013.01); *B60L 53/62* (2019.02); *F02N 11/12* (2013.01);
(Continued)

(58) Field of Classification Search
CPC ............... F02N 2300/306; F02N 11/14; F02N 11/0862; F02N 11/12; F02N 11/087;
(Continued)

(56) References Cited

U.S. PATENT DOCUMENTS

| | | |
|---|---|---|
| 3,343,057 A | 9/1967 | Smith |
| 3,590,357 A | 6/1971 | Reid |

(Continued)

FOREIGN PATENT DOCUMENTS

| | | |
|---|---|---|
| CN | 203318324 U | 12/2013 |
| EP | 2712757 A2 | 4/2014 |

(Continued)

OTHER PUBLICATIONS

Cunningham, Wayne, Three pocket-size jump starters, http://www.cnet.com/news/pocket-sized-jump-starters/, Apr. 28, 2014 (7 pages).
(Continued)

*Primary Examiner* — Lindsay M Low
*Assistant Examiner* — Charles J Brauch
(74) *Attorney, Agent, or Firm* — Michael Stanley Tomsa; McAndrews, Held & Malloy, Ltd.

(57) ABSTRACT

A battery booster for jumpstarting a vehicle having an external battery. The battery booster may include a processor, a set of terminal connectors, a power supply, and a power-management circuit. The set of terminal connectors may be configured to couple with the external battery or an engine that is electrically coupled with the external battery. The power supply may include a lithium battery configured to supply a starting current to jump start an engine. The external battery may have a first nominal voltage, while the lithium battery may have a second nominal voltage that is greater than the first nominal voltage. The power-management circuit operatively coupled with the at least one processor, wherein the at least one processor is configured to transfer power selectively between the external battery and the power supply. The processor is configured to perform a pre-charge function and/or a back-feed function via the power-management circuit, which may employ a pulse width modulation (PWM) driver.

21 Claims, 7 Drawing Sheets

Related U.S. Application Data

(60) Provisional application No. 62/725,164, filed on Aug. 30, 2018.

(51) Int. Cl.
| | |
|---|---|
| *F02N 11/12* | (2006.01) |
| *H01M 10/0525* | (2010.01) |
| *H01M 10/48* | (2006.01) |
| *H02J 7/00* | (2006.01) |

(52) U.S. Cl.
CPC ..... *H01M 10/0525* (2013.01); *H02J 7/00711* (2020.01); *H01M 10/48* (2013.01); *H01M 2220/20* (2013.01)

(58) Field of Classification Search
CPC ......... F02N 2200/063; F02N 2300/108; B60L 53/62; H01M 10/0525; H01M 10/48; H01M 2220/20; H02J 7/00711; H02J 7/0048; H02J 7/0049; H02J 1/122; H02J 7/342; H02J 7/0029; H02J 7/0042; Y02E 60/10; Y02T 10/70; Y02T 10/7072; Y02T 90/12
See application file for complete search history.

(56) References Cited

U.S. PATENT DOCUMENTS

| | | | |
|---|---|---|---|
| 3,778,632 A | 12/1973 | Sarbacher | |
| 3,950,688 A | 4/1976 | Sancey et al. | |
| 4,079,304 A | 3/1978 | Brandenburg | |
| 4,829,223 A | 5/1989 | Broberg et al. | |
| 4,925,750 A | 5/1990 | Theiss | |
| 4,983,473 A | 1/1991 | Smith | |
| 5,194,799 A | 3/1993 | Tomantschger | |
| 5,589,292 A | 12/1996 | Rozon | |
| 5,678,077 A | 10/1997 | Ichikawa et al. | |
| 5,741,305 A | 4/1998 | Vincent et al. | |
| 5,764,030 A | 6/1998 | Gaza | |
| 5,793,185 A | 8/1998 | Prelec et al. | |
| 5,796,255 A | 8/1998 | McGowan | |
| 5,814,972 A | 9/1998 | Shimada et al. | |
| 6,020,719 A | 2/2000 | Nishigaki et al. | |
| 6,130,519 A | 10/2000 | Whiting et al. | |
| 6,140,797 A | 10/2000 | Dunn | |
| 6,155,870 A | 12/2000 | Valentine | |
| 6,198,249 B1 | 3/2001 | Kroll et al. | |
| 6,215,273 B1 | 4/2001 | Shy | |
| 6,344,733 B1 | 2/2002 | Crass et al. | |
| 6,356,050 B1 | 3/2002 | Hussaini | |
| 6,377,029 B1 | 4/2002 | Krieger et al. | |
| 6,380,712 B2 | 4/2002 | Murphy et al. | |
| 6,384,573 B1 | 5/2002 | Dunn | |
| 6,424,158 B2 | 7/2002 | Klang | |
| 6,466,025 B1 | 10/2002 | Klang | |
| 6,625,477 B1 | 9/2003 | Wakefield | |
| 6,679,212 B2 | 1/2004 | Kelling | |
| 6,756,764 B2 | 6/2004 | Smith | |
| 6,788,025 B2 | 9/2004 | Bertness et al. | |
| 6,799,993 B2 | 10/2004 | Krieger et al. | |
| 6,819,010 B2 | 11/2004 | Burke | |
| 6,871,151 B2 | 3/2005 | Bertness | |
| 6,871,625 B1 | 3/2005 | Burke | |
| 6,943,666 B2 | 9/2005 | Mooney et al. | |
| 6,988,475 B2 | 1/2006 | Burke | |
| 7,003,411 B2 | 2/2006 | Bertness | |
| 7,015,674 B2 | 3/2006 | VonderHaar | |
| 7,161,253 B2 | 1/2007 | Sodeman | |
| 7,161,476 B2 | 1/2007 | Hardman et al. | |
| 7,180,200 B2 | 2/2007 | Nalter et al. | |
| 7,301,303 B1 | 11/2007 | Hulden | |
| 7,309,928 B2 | 12/2007 | Grant et al. | |
| 7,339,347 B2 | 3/2008 | Elder et al. | |
| 7,345,450 B2 | 3/2008 | Krieger et al. | |
| 7,408,358 B2 | 8/2008 | Knopf | |
| 7,498,767 B2 | 3/2009 | Brown et al. | |
| 7,501,795 B2 | 3/2009 | Bertness et al. | |
| 7,528,579 B2 | 5/2009 | Pacholok et al. | |
| 7,598,743 B2 | 10/2009 | Bertness | |
| 7,656,118 B2 | 2/2010 | Krieger et al. | |
| 7,687,926 B2 | 3/2010 | Grant et al. | |
| 7,772,850 B2 | 8/2010 | Bertness | |
| 7,774,151 B2 | 8/2010 | Bertness | |
| 7,808,211 B2 | 10/2010 | Pacholok et al. | |
| 7,808,375 B2 | 10/2010 | Bertness et al. | |
| 7,834,593 B2 | 11/2010 | Johnson et al. | |
| 7,915,856 B2 | 3/2011 | Krampitz et al. | |
| 7,924,015 B2 | 4/2011 | Bertness | |
| 7,989,969 B2 | 8/2011 | Grant et al. | |
| 8,013,567 B2 | 9/2011 | Windsor | |
| 8,120,364 B2 | 2/2012 | Elder et al. | |
| 8,179,103 B2 | 5/2012 | Doljack | |
| 8,188,708 B2 | 5/2012 | Altekruse et al. | |
| 8,237,412 B2 | 8/2012 | Johnson et al. | |
| 8,319,357 B2 | 11/2012 | Usselman et al. | |
| 8,386,199 B2 | 2/2013 | Goff et al. | |
| 8,437,908 B2 | 5/2013 | Goff et al. | |
| 8,513,949 B2 | 8/2013 | Bertness | |
| 8,558,690 B2 | 10/2013 | Kleve et al. | |
| 8,575,899 B2 | 11/2013 | Whiting et al. | |
| 8,576,061 B2 | 11/2013 | Miller et al. | |
| 8,610,396 B2 | 12/2013 | Hunter et al. | |
| 8,664,912 B2 | 3/2014 | Olsberg | |
| 8,664,915 B2 | 3/2014 | Sutardja | |
| 8,674,654 B2 | 3/2014 | Bertness | |
| 8,759,991 B2 | 6/2014 | Grant et al. | |
| 8,854,013 B2 | 10/2014 | Gao et al. | |
| 8,872,516 B2 | 10/2014 | Bertness | |
| 8,947,054 B2 | 2/2015 | Johnson et al. | |
| 8,958,998 B2 | 2/2015 | Bertness | |
| 9,007,015 B1 | 4/2015 | Nook et al. | |
| 9,013,323 B2 | 4/2015 | Grothaus et al. | |
| 9,018,958 B2 | 4/2015 | Bertness | |
| 9,060,213 B2 | 6/2015 | Jones | |
| 9,216,659 B2 | 12/2015 | Seo et al. | |
| 9,260,067 B2 | 2/2016 | Kai | |
| 9,263,907 B2 | 2/2016 | Richardson et al. | |
| 9,276,438 B2 | 3/2016 | Grant et al. | |
| 9,371,067 B2 | 6/2016 | Dao et al. | |
| 9,506,446 B2 | 11/2016 | Xinfang | |
| 9,525,297 B2 | 12/2016 | Wang | |
| 9,553,460 B2 | 1/2017 | Dao et al. | |
| 9,581,654 B2 | 2/2017 | Campbell et al. | |
| 9,653,933 B2 | 5/2017 | Inskeep | |
| 9,673,652 B2 | 6/2017 | Inskeep | |
| 9,768,435 B2 | 9/2017 | Koebler et al. | |
| 9,770,992 B2 | 9/2017 | Nook et al. | |
| 9,819,204 B2 | 11/2017 | Miller et al. | |
| 9,954,207 B2 | 4/2018 | Koebler | |
| 10,174,736 B2 | 1/2019 | Hang | |
| 10,389,139 B2 | 8/2019 | Velderman et al. | |
| 10,446,885 B2 | 10/2019 | Clarke et al. | |
| 10,587,125 B2 | 3/2020 | Edwards et al. | |
| 2001/0038276 A1 | 11/2001 | Resch et al. | |
| 2002/0008523 A1 | 1/2002 | Klang | |
| 2002/0041174 A1* | 4/2002 | Purkey | H01M 50/247 320/103 |
| 2002/0145404 A1 | 10/2002 | Dasgupta et al. | |
| 2002/0167296 A1 | 11/2002 | Nagata et al. | |
| 2003/0052645 A1 | 3/2003 | Sasaki | |
| 2003/0137277 A1 | 7/2003 | Ichiro | |
| 2003/0169022 A1 | 9/2003 | Turner et al. | |
| 2004/0052022 A1 | 3/2004 | Laraia | |
| 2004/0130298 A1 | 7/2004 | Krieger et al. | |
| 2004/0239290 A1 | 12/2004 | Krieger | |
| 2004/0251876 A1 | 12/2004 | Bertness | |
| 2005/0065558 A1 | 3/2005 | Powers et al. | |
| 2005/0088626 A1 | 4/2005 | Huang | |
| 2005/0258797 A1 | 11/2005 | Hung | |
| 2005/0285445 A1 | 12/2005 | Wruck et al. | |
| 2006/0006841 A1 | 1/2006 | Lee | |
| 2006/0133007 A1 | 6/2006 | Shiue et al. | |
| 2006/0244412 A1 | 11/2006 | Bonzer et al. | |

(56) References Cited

U.S. PATENT DOCUMENTS

| | | |
|---|---|---|
| 2007/0063675 A1 | 3/2007 | Walline et al. |
| 2007/0278990 A1 | 12/2007 | Raichle et al. |
| 2007/0285049 A1 | 12/2007 | Krieger |
| 2008/0061733 A1 | 3/2008 | Toya |
| 2008/0129219 A1 | 6/2008 | Smith et al. |
| 2008/0218104 A1 | 9/2008 | Lukic et al. |
| 2008/0246443 A1 | 10/2008 | Doljack |
| 2008/0265844 A1 | 10/2008 | Smith et al. |
| 2008/0275737 A1 | 11/2008 | Gentry et al. |
| 2009/0171600 A1 | 7/2009 | Machiyama |
| 2009/0174362 A1 | 7/2009 | Richardson et al. |
| 2009/0187077 A1 | 7/2009 | Hosoda et al. |
| 2009/0218988 A1 | 9/2009 | Richardson et al. |
| 2009/0246596 A1 | 10/2009 | Sridhar |
| 2010/0039065 A1 | 2/2010 | Kinkade, Jr. |
| 2010/0072946 A1 | 3/2010 | Sugano |
| 2010/0117591 A1 | 5/2010 | Thomas et al. |
| 2010/0235087 A1 | 9/2010 | Mimura |
| 2010/0241377 A1 | 9/2010 | Kagawa |
| 2010/0301800 A1 | 12/2010 | Inskeep |
| 2010/0315046 A1 | 12/2010 | Trainor et al. |
| 2011/0012553 A1 | 1/2011 | Sloan et al. |
| 2011/0012561 A1 | 1/2011 | Whiting et al. |
| 2011/0029157 A1 | 2/2011 | Muzaffer |
| 2011/0046831 A1 | 2/2011 | Ananthakrishna |
| 2011/0074350 A1 | 3/2011 | Kocher |
| 2011/0095728 A1 | 4/2011 | Chen et al. |
| 2011/0100735 A1 | 5/2011 | Flett |
| 2011/0130905 A1 | 6/2011 | Mayer |
| 2011/0133689 A1 | 6/2011 | Uchihashi et al. |
| 2011/0183184 A1 | 7/2011 | Jan |
| 2011/0206950 A1 | 8/2011 | Doege |
| 2011/0258112 A1 | 10/2011 | Eder et al. |
| 2012/0019190 A1 | 1/2012 | Jones et al. |
| 2012/0068662 A1 | 3/2012 | Durando |
| 2012/0091944 A1 | 4/2012 | Rogers |
| 2012/0105010 A1 | 5/2012 | Kinoshita |
| 2012/0126755 A1* | 5/2012 | Perisic .................. B60L 55/00 320/145 |
| 2012/0140752 A1 | 6/2012 | Yun |
| 2012/0235473 A1 | 9/2012 | Jiang et al. |
| 2012/0309315 A1 | 12/2012 | Sakata |
| 2013/0002049 A1 | 1/2013 | Stampfli |
| 2013/0020993 A1 | 1/2013 | Taddeo |
| 2013/0086409 A1 | 4/2013 | Lu et al. |
| 2013/0099738 A1 | 4/2013 | Brockman et al. |
| 2013/0241498 A1 | 9/2013 | Koebler |
| 2013/0264875 A1 | 10/2013 | Kaminsky et al. |
| 2013/0310112 A1 | 11/2013 | You et al. |
| 2014/0013128 A1 | 1/2014 | Wong |
| 2014/0084844 A1 | 3/2014 | Weflen |
| 2014/0088827 A1 | 3/2014 | Yashiro |
| 2014/0107864 A1 | 4/2014 | Cecchini |
| 2014/0139175 A1 | 5/2014 | Gonzalez |
| 2014/0159509 A1 | 6/2014 | Inskeep |
| 2014/0253017 A1 | 9/2014 | Kominami et al. |
| 2014/0300310 A1 | 10/2014 | Caren |
| 2014/0300311 A1 | 10/2014 | Caren et al. |
| 2015/0102781 A1 | 4/2015 | Inskeep |
| 2015/0130400 A1 | 5/2015 | Inskeep |
| 2015/0168499 A1 | 6/2015 | Palmisano |
| 2015/0372531 A1 | 12/2015 | Tanabe |
| 2016/0049018 A1* | 2/2016 | Groß .................. G01R 31/007 701/99 |
| 2016/0049819 A1* | 2/2016 | Butler .................. H02J 7/02 320/105 |
| 2016/0072323 A1 | 3/2016 | Miller et al. |
| 2016/0072329 A1 | 3/2016 | Miller et al. |
| 2016/0181587 A1 | 6/2016 | Koebler et al. |
| 2016/0226266 A1 | 8/2016 | Huang |
| 2016/0238667 A1 | 8/2016 | Palmisano et al. |
| 2016/0268645 A1 | 9/2016 | Koebler |
| 2017/0012448 A1 | 1/2017 | Miller et al. |
| 2017/0067952 A1 | 3/2017 | Clarke et al. |
| 2017/0110766 A1 | 4/2017 | Koebler |
| 2017/0163066 A1 | 6/2017 | Inskeep et al. |
| 2017/0288435 A1 | 10/2017 | Miller et al. |
| 2017/0310153 A1 | 10/2017 | Inskeep |
| 2017/0317492 A1 | 11/2017 | Koebler |
| 2017/0335817 A1 | 11/2017 | De Lise et al. |
| 2017/0346140 A1 | 11/2017 | Koebler |
| 2018/0048168 A1 | 2/2018 | Miller et al. |
| 2018/0111491 A1 | 4/2018 | Nook et al. |
| 2018/0215274 A1 | 8/2018 | Nook et al. |
| 2018/0233934 A1 | 8/2018 | Miller et al. |
| 2018/0342883 A1 | 11/2018 | Inskeep et al. |
| 2020/0067333 A1 | 2/2020 | Wekwert et al. |

FOREIGN PATENT DOCUMENTS

| | | |
|---|---|---|
| EP | 3211755 A1 | 2/2017 |
| WO | 2014142759 A1 | 9/2014 |
| WO | 2018098441 A1 | 5/2018 |

OTHER PUBLICATIONS

URL:https://www.youtube.com/watch?v=dZ6YduxgsMA&feature=youtu.be&t=51 [retrieved on Apr. 11, 2019] (2 pages).
"Jump-N-Carry® Models 300, 400, 660, 950, 4000 & 12/24" Specification Sheet (8 pages).
http://www.a123systems.com/a123/products; A 123 Systems; Watertown, MA; 2010 (1 page).
http://www.omnicel.com/spec/er-18505-hd.pdf; OmniCel; Phoenixville, PA; 2010 (2 pages).
http://www.dowkokam.com/; Dow Kokam; Midland, MI (1 page).
NOCO GB70 BoostHD Jump Starter brochure (2 pages).
NOCO GB40 Boost Plus Jump Starter brochure (2 pages).
Rezervo RZ-300 Batteryless Jump Starter brochure (2 pages).
International Search Report and Written Opinion, mailed Nov. 23, 2015, in International application No. PCT/US2015/045335, filed Aug. 14, 2015 (12 pages).
International Preliminary Report on Patentability, issued Feb. 14, 2017, in International application No. PCT/US2015/045335, filed Aug. 14, 2015 (6 pages).
Supplemental European Search Report for Application No. EP 15 83 2596, dated Feb. 1, 2018 (10 pages).
Communication in European Application No. EP 15 832 596.9, dated Feb. 5, 2019 (7 pages).
Communication in European Application No. EP 15 831 498.9, dated Apr. 18, 2019 (9 pages).
Examination report No. 1 for standard patent application in Australian Application No. 2018241089, dated Nov. 25, 2019 (3 pages).
Examination report No. 1 for standard patent application in Australian Application No. 2020201589, dated Nov. 5, 2020 (4 pages).

* cited by examiner

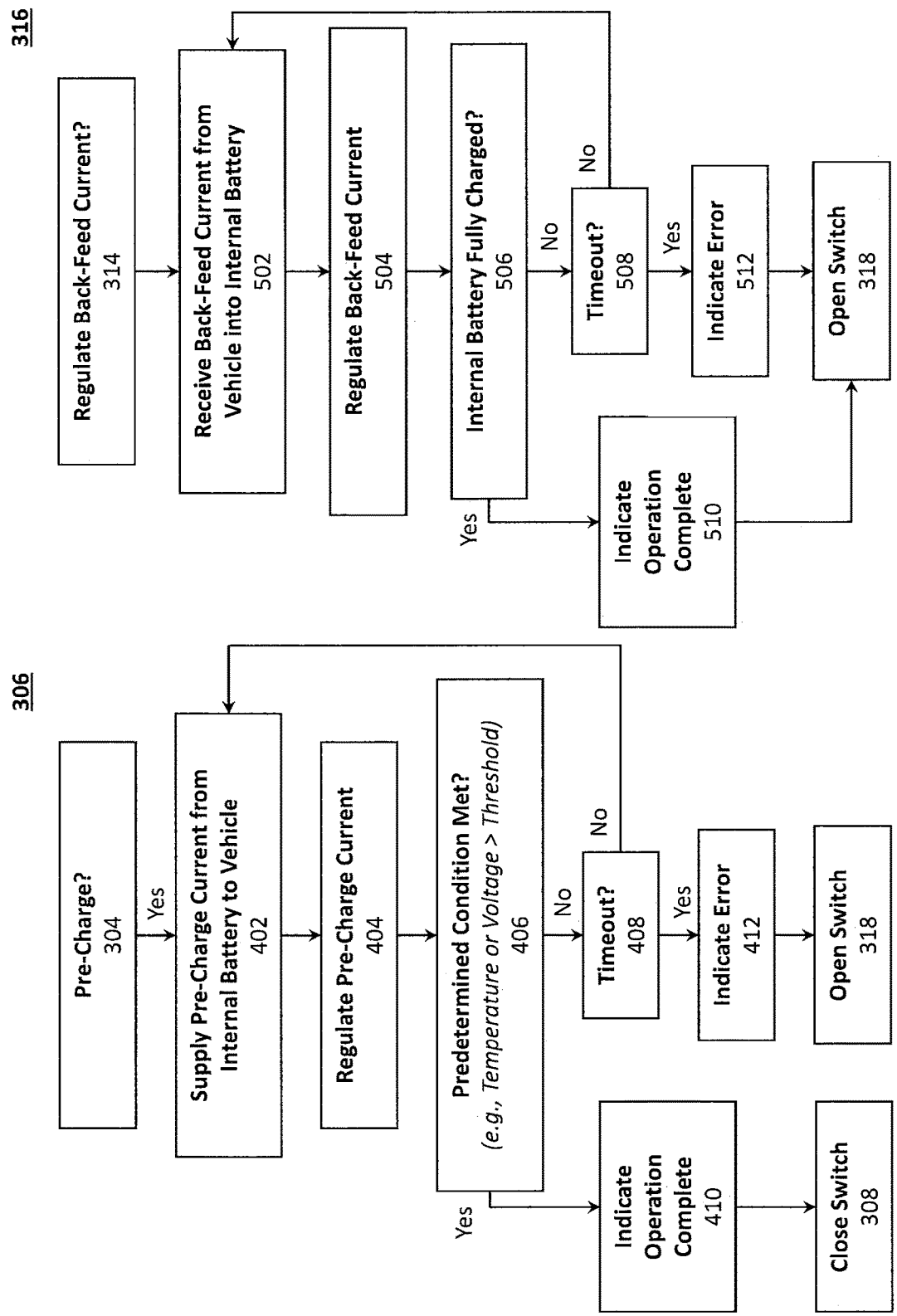

MULTIFUNCTIONAL BATTERY BOOSTER

RELATED APPLICATIONS

The present application claims priority to U.S. patent application Ser. No. 16/556,525, filed Aug. 30, 2019, which claims the benefit under 35 U.S.C. § 119(e) of U.S. Provisional Patent Application No. 62/725,164, filed Aug. 30, 2018, and titled "Multifunctional Battery Booster," the contents of which are hereby incorporated by reference.

BACKGROUND

The present disclosure relates to a portable battery booster system and apparatus. More specifically, the present disclosure relates to systems, methods, and apparatuses for providing a compact battery booster and/or charger.

It is well known that motorists from time to time find themselves with a battery of insufficient charge to start their vehicle. This is generally an occasion of extreme inconvenience and distress, particularly where one finds himself in this situation in an area where there are other vehicles and drivers, but no means for connecting the battery of the disabled vehicle to the battery of one of the other available vehicles. Despite the advancements thus far, a need exists for an improved battery booster, and, more particularly, to an improved lithium battery booster.

SUMMARY

The present disclosure is directed to an improved battery booster and charger, and, more particularly, to an improved lithium battery booster and charger.

According to a first aspect, a method of jumpstarting a vehicle using a battery booster comprises: detecting an external battery of the vehicle coupled across a set of terminal connectors of the battery booster, wherein the external battery has a first nominal voltage; supplying a pre-charge current from a lithium battery of the battery booster to the external battery until a predetermined battery condition is detected, wherein the lithium battery has a second nominal voltage that is greater than the first nominal voltage; after predetermined battery condition is detected, supplying a starting current from the lithium battery of the battery booster to the vehicle to jump start an engine of the vehicle, wherein the starting current is greater than the pre-charge current.

According to a second aspect, a battery booster for jumpstarting a vehicle having an external battery comprises: at least one processor; a set of terminal connectors configured to couple with the external battery or an engine that is electrically coupled with the external battery; a power supply having a lithium battery configured to supply a starting current to jump start an engine; and a power-management circuit operatively coupled with the at least one processor, wherein the at least one processor is configured to transfer power selectively between the external battery and the power supply, wherein the at least one processor is configured to perform a back-feed function via the power-management circuit to pass a back-feed current from the vehicle to the lithium battery via the power-management circuit for a predetermined period of time.

According to a third aspect, a battery booster for jumpstarting a vehicle having an external battery comprises: at least one processor; a set of terminal connectors configured to couple with the external battery or an engine that is electrically coupled with the external battery, wherein the external battery has a first nominal voltage; a power supply having a lithium battery configured to supply a starting current to jump start an engine, wherein the lithium battery has a second nominal voltage that is greater than the first nominal voltage; and a power-management circuit operatively coupled with the at least one processor, wherein the at least one processor is configured to transfer power selectively between the external battery and the power supply.

In certain aspects, the second nominal voltage that is at least 30% greater than the first nominal voltage.

In certain aspects, the first nominal voltage is 12 volts and the second nominal voltage is 16 volts.

In certain aspects, the first nominal voltage is 48 volts.

In certain aspects, the battery booster further comprises a display device operatively coupled to the at least one processor and configured to display a state of charge of the lithium battery.

In certain aspects, the power supply further comprises a supercapacitor that is coupled to the lithium battery in parallel.

In certain aspects, the at least one processor is configured to perform a pre-charge function via the power-management circuit.

In certain aspects, the at least one processor is configured to, during the pre-charge function, pass a charging current from the lithium battery to the external battery via the power-management circuit until a predetermined booster condition is met.

In certain aspects, the predetermined booster condition relates to a voltage of the external battery.

In certain aspects, the predetermined booster condition relates to a temperature of the internal battery.

In certain aspects, the at least one processor is configured to perform a back-feed function via the power-management circuit.

In certain aspects, the at least one processor is configured to, during the back-feed function, pass a back-feed current from the vehicle to the lithium battery via the power-management circuit until a predetermined booster condition is met.

In certain aspects, the power-management circuit comprises a pulse width modulation (PWM) driver operatively coupled to one or more switches, wherein the at least one processor is configured to, during the back-feed function, modulate the back-feed current via the PWM driver and one or more switches.

In certain aspects, at least one of the one or more switches is a transistor.

In certain aspects, the power-management circuit is configured to charge the lithium battery.

In certain aspects, the power-management circuit comprises a single-ended primary-inductor converter configured to receive a variable input voltage between 5 volts DC and 20 volts DC and to output a predetermined charge voltage to said lithium battery.

In certain aspects, the supercapacitor is configured to draw a charging current from the lithium battery.

In certain aspects, the supercapacitor is configured to draw a charging current from the external battery via the set of terminal connectors before the power-management circuit provides the starting current to the external battery.

In certain aspects, the external battery is sufficiently depleted such that it is unable to start the engine.

In certain aspects, the lithium battery is rated at least 10,000 mAh.

In certain aspects, the battery booster further comprises a wireless transceiver to communicate with a remote device over a network.

In certain aspects, the remote device is a smart phone or a tablet computer.

In certain aspects, the battery booster is configured to be wirelessly controlled by the remote device via the wireless transceiver.

In certain aspects, the processor is configured to detect a drop in current across the set of terminal connectors and the power-management circuit is configured to provide the starting current upon the processor detecting the drop in current across the set of terminal connectors.

In certain aspects, the battery booster further comprises a universal serial bus (USB) port to output a first charging current from the lithium battery.

In certain aspects, the battery booster further comprises a second USB port to output a second charging current that is different from the first charging current.

In certain aspects, each of the first current and the second current are less than 3.0 amperes.

In certain aspects, the battery booster further comprises a display device to display a state of charge of said lithium battery or said external battery.

In certain aspects, the set of terminal connectors are configured to electrically couple with the battery booster at a DC output port using an EC5 connector.

In certain aspects, the set of terminal connectors are configured to electrically couple with the battery booster using one or more magnetic connectors.

BRIEF DESCRIPTION OF THE DRAWINGS

These and other advantages of the present disclosure will be readily understood with reference to the following specifications and attached drawings wherein:

FIG. 4 illustrates a flow diagram of an example pre-charge function.

FIG. 5 illustrates a flow diagram of an example current back-feed function.

DETAILED DESCRIPTION

Figure 1A:
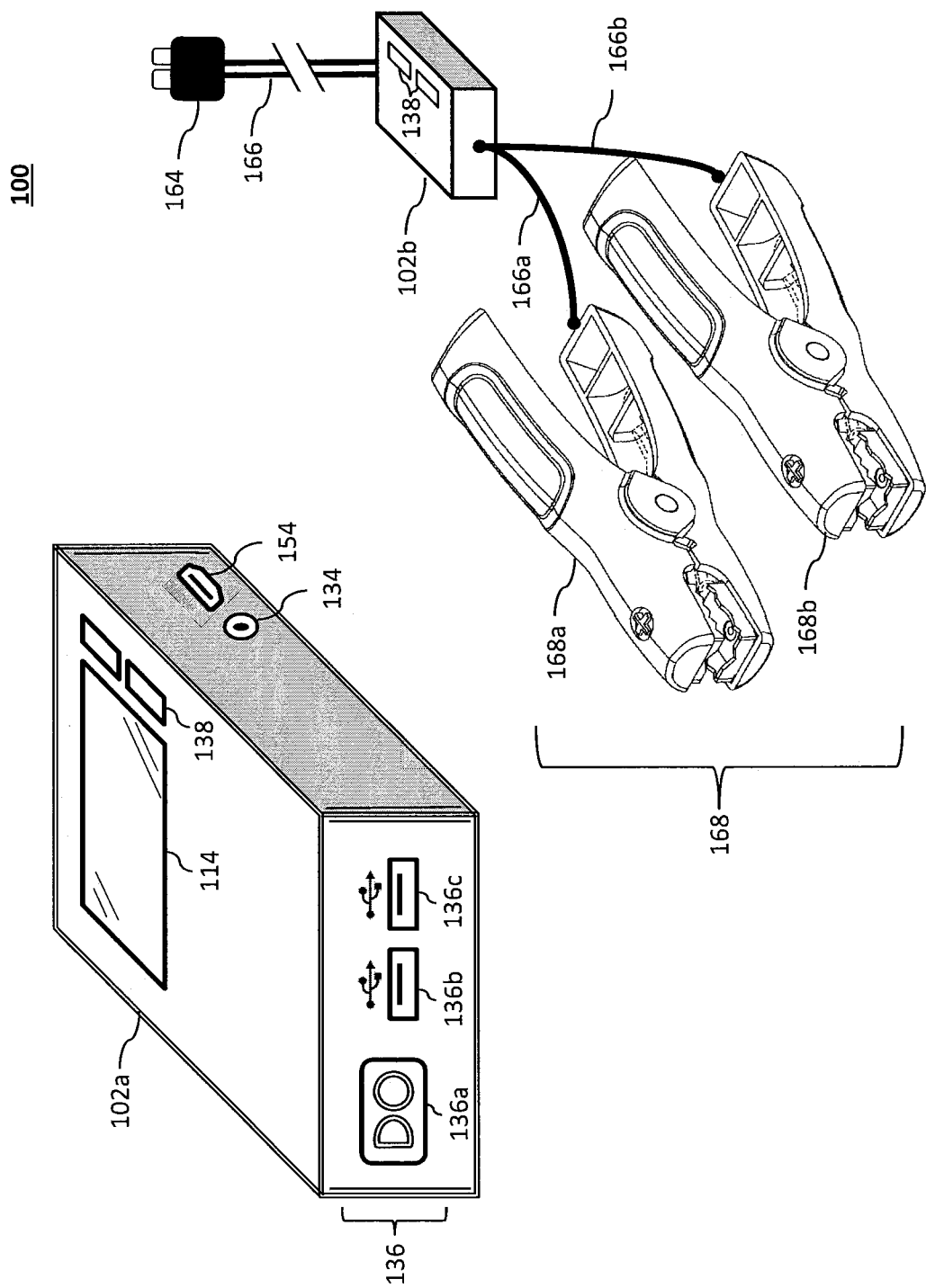
FIG. 1a illustrates a front perspective view of an exemplary battery booster.

Preferred embodiments of the present disclosure will be described hereinbelow with reference to the accompanying drawings. In the following description, well-known functions or constructions are not described in detail because they may obscure the disclosure in unnecessary detail. The present disclosure relates to a battery booster system, method, and apparatus. For this disclosure, the following terms and definitions shall apply:

As used herein, the word "exemplary" means "serving as an example, instance, or illustration." The embodiments described herein are not limiting, but rather are exemplary only. It should be understood that the described embodiments are not necessarily to be construed as preferred or advantageous over other embodiments. Moreover, the terms "embodiments of the invention," "embodiments," or "invention" do not require that all embodiments of the invention include the discussed feature, advantage, or mode of operation.

The terms "communicate" and "communicating" as used herein, include both conveying data from a source to a destination and delivering data to a communications medium, system, channel, network, device, wire, cable, fiber, circuit, and/or link to be conveyed to a destination. The term "communication" as used herein means data so conveyed or delivered. The term "communications" as used herein includes one or more of a communications medium, system, channel, network, device, wire, cable, fiber, circuit, and/or link.

The terms "coupled," "coupled to," and "coupled with" as used herein, each mean a relationship between or among two or more devices, apparatuses, files, circuits, elements, functions, operations, processes, programs, media, components, networks, systems, subsystems, and/or means, constituting any one or more of: (i) a connection, whether direct or through one or more other devices, apparatuses, files, circuits, elements, functions, operations, processes, programs, media, components, networks, systems, subsystems, or means; (ii) a communications relationship, whether direct or through one or more other devices, apparatuses, files, circuits, elements, functions, operations, processes, programs, media, components, networks, systems, subsystems, or means; and/or (iii) a functional relationship in which the operation of any one or more devices, apparatuses, files, circuits, elements, functions, operations, processes, programs, media, components, networks, systems, subsystems, or means depends, in whole or in part, on the operation of any one or more others thereof.

The term "data" as used herein means any indicia, signals, marks, symbols, domains, symbol sets, representations, and any other physical form or forms representing information, whether permanent or temporary, whether visible, audible, acoustic, electric, magnetic, electromagnetic, or otherwise manifested. The term "data" is used to represent predetermined information in one physical form, encompassing any and all representations of corresponding information in a different physical form or forms.

The term "database" as used herein means an organized body of related data, regardless of the manner in which the data or the organized body thereof is represented. For example, the organized body of related data may be in the form of one or more of a table, map, grid, packet, datagram, frame, file, email, message, document, report, list, or any other form.

The term "network" as used herein includes both networks and inter-networks of all kinds, including the Internet, and is not limited to any particular network or inter-network.

The term "processor" as used herein means processing devices, apparatuses, programs, circuits, components, systems, and subsystems, whether implemented in hardware, tangibly embodied software, or both, and whether or not it is programmable. The term "processor" as used herein includes, but is not limited to, one or more computing devices, hardwired circuits, signal-modifying devices and systems, devices and machines for controlling systems, central processing units, programmable devices and systems, field-programmable gate arrays, application-specific integrated circuits, systems on a chip, systems comprising discrete elements and/or circuits, state machines, virtual machines, data processors, processing facilities, and combinations of any of the foregoing.

A battery booster, as disclosed herein, may be used to start (a/k/a "boost", "jump", or "jump-start") an engine operatively coupled to an external battery 104 (e.g., a 6V/12V/ 24V/48V nominal voltage vehicular battery or battery bank, which may be fully or partially depleted). In certain aspects, the battery booster 100 may be further configured to charge the external battery 104, and/or other electronic devices operatively coupled with the battery booster. Example vehicular batteries include, without limitation, lead acid batteries (e.g., wet/flooded batteries, calcium-calcium batteries, Valve-Regulated, Lead Acid (VRLA) batteries, gel cell, and Absorbed Glass Mat (AGM)) and other rechargeable batteries (e.g., lithium ion, lithium ion polymer, Nickel-Metal Hydride (NiMH), Nickel Cadmium (NiCd)). Other electronic devices that may be operatively coupled with the battery booster include, for example, portable electronic devices 152 (e.g., phones, tablet computers, portable computers, etc.), toys, etc.

FIG. 1a illustrates a front perspective view of an exemplary battery booster 100. The battery booster 100 may be, for example, a compact battery booster that is light weight and capable of hand-held use. As illustrated, the battery booster 100 may generally comprise one or more housings 102 (e.g., a first housing 102a and a second housing 102b) having, inter alia, a display device 114, an AC input terminal 134, a user interface 138, a plurality of DC output terminals 136, and/or a DC input terminal 154. The plurality of DC output terminals 136 may be used to charge (e.g., provide a charging current to external battery 104 or one or more portable electronic devices 152), boost (e.g., provide a boosting energy to a vehicle 106/external battery 104), or otherwise power external devices, including portable electronic devices 152, an external battery 104, an engine, etc. For example, the DC output terminals 136 may comprise a DC booster output 136a, a first DC accessory output 136b, a second DC accessory output 136c, etc.

In certain aspects, one or more of the first DC accessory output 136b and the second DC accessory output 136c may be a USB Port, 12V port (e.g., a cigarette lighter socket), etc., a DC connector may be used for both DC input terminal 154 and DC output terminal 136.

While all of the components of the battery booster 100 may be provided in a single housing 102, in certain aspects, it may be advantageous to place certain components in a second housing 102b (e.g., serving as an auxiliary housing), thereby reducing the size of the first housing 102a (e.g., serving as a primary housing). For example, components that may be specific to jump starting an engine (as opposed to functions that may be used for other purposes, such as those for charging accessories, such as portable electronic devices 152) may be provided via the second housing 102b to reduce the size necessary for the first housing 102a.

The battery booster 100 can be removably coupled with a vehicle 106 or the external battery 104 (e.g., at its battery posts/terminals) of the vehicle 106 via a pair of electrical conductors 166 (e.g., positive and negative electrical conductors 166a, 166b), which can be electrically coupled with the battery booster 100 at one of the DC output terminals 136 (e.g., the DC booster output 136a). Each of the electrical conductors 166 may be, for example, a battery cable having a terminal connector at its distal end. The terminal connectors may be a set of battery clamps 168 (i.e., a positive clamp 168a and a negative clamp 168b), a set of ring connectors, a plug (e.g., a quick connect plug), etc. As illustrated, the second housing 102b (and associated components/circuitry) may be provided on one or both of the pair of electrical conductors 166 and position in line between the battery booster 100 (e.g., the detachable electrical ports/connectors 164) and the battery clamps 168. For example, a processor 128 and the power-management circuit 132 (or portions thereof) may be provided via the second housing 102b. In certain aspects, the detachable electrical ports/connectors 164 may be coupled, or integral with, the second housing 102b rather than via a length of electrical conductors 166.

In addition to conveying a charging current and/or boosting current to the external battery 104, the battery booster 100 can also measure, inter alia, the battery voltage of the external battery 104 and/or the current through the external battery 104 via the electrical conductors 166a, 166b. The electrical conductors 166a, 166b may employ, for example, battery clamps 168 capable of Kelvin sensing (four terminal sensing). Kelvin sensing is an electrical impedance measuring technique that uses two separate pairs of current-carrying and voltage-sensing electrodes per conductor 166a, 166b to provide more accurate measurements than two-terminal (2T) sensing. To that end, each of the electrical conductors 166a, 166b may employ multiple electrically isolated electrodes (i.e., cables, conductors, wires, etc.), whether sharing an insulated outer casing or otherwise bundled. By way of illustration, each of the electrical conductors 166a, 166b may employ two electrodes and provide two battery contacts (e.g., via battery clamps 168 capable of Kelvin sensing).

The proximal end of the electrical conductors 166a, 166b may be removably coupled with the battery booster 100 at the DC booster output 136a via, for example, one or more detachable electrical ports/connectors 164 (e.g., EC5 connectors, barrel connectors, pin connectors, magnetic connectors, etc.). In another example, the proximal end of the electrical conductors 166a, 166b may be fixedly coupled (i.e., non-removably coupled, for example, soldered) with the battery booster 100. One or both of the housings 102a, 102b of the battery booster 100 may further include one or more cable wrapping posts or another structure around which various cords may be wrapped, secured, or retracted.

Figure 1B:
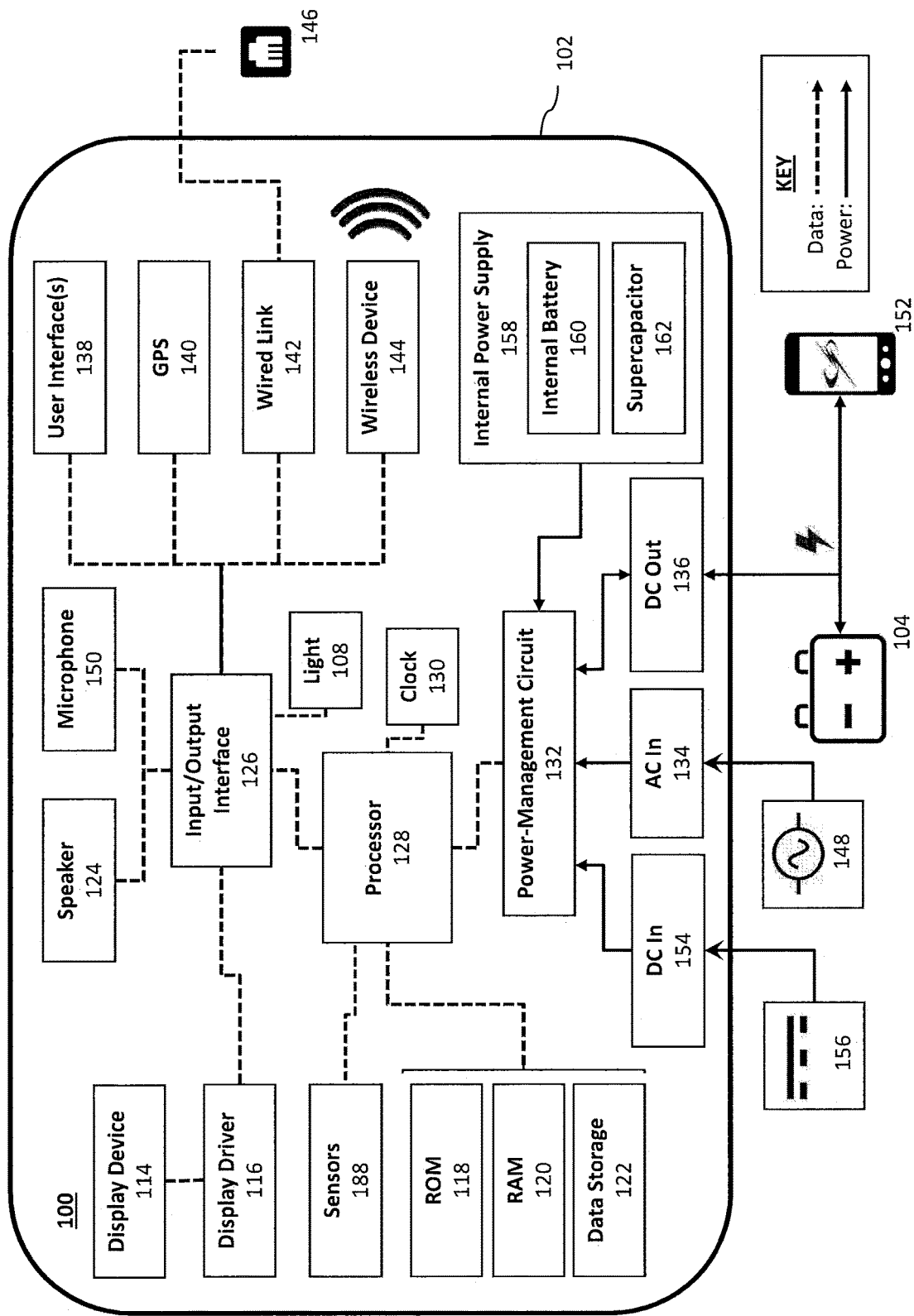
FIG. 1b illustrates a block diagram of an example battery booster.

FIG. 1b illustrates a block diagram of an example battery booster 100. The battery booster 100 may comprise one or more processors 128 (e.g., a microprocessor, a central processing unit (CPU), etc.) to control the various operations of the battery booster 100 (e.g., to monitor and/or selectively charge or boost external devices). The one or more processors 128 may be operatively coupled to one or more memory devices, such as a read-only memory (ROM) 118 for receiving one or more instruction sets, a random access memory (RAM) 120 having a plurality of buffers for temporarily storing and retrieving information, and to an internal data storage device 122 (e.g., a hard drive, such a solid state drive, or other non-volatile data storage device, such as flash memory). A clock 130 is also coupled to the processor 128 for providing clock or timing signals or pulses thereto. Those skilled in the art will understand that the battery booster 100 includes one or more bus structures for interconnecting its various components.

For purposes of illustration, the various components are illustrated as being contained within a single housing 102. Indeed, to increase ease of use in mobile applications, the various components of a battery booster 100 may be housed in a single housing 102. Aa noted above, however, it is contemplated that certain components or functionality may be provided via a second housing. Further, while a single component may be illustrated, the described functionality may be distributed across multiple components. For example, while a single processor 128 is illustrated, a plurality of processors 128 may be used to operate the battery booster 100; whether in the same housing or separate housings (e.g., housings 102*a*, 102*b*). Accordingly, serial communication may be employed to communicate information and data between multiple processors 128 that may be used.

The internal power supply 158 may be used to charge the portable electronic devices 152, charge the external battery 104, jump start the engine of the vehicle 106 associated with the external battery 104, and/or power the components of the battery booster 100 (e.g., when disconnected from a DC power supply 156 and/or an AC power supply 148). The internal power supply 158 may comprise one or more internal batteries 160 and/or one or more supercapacitors 162. For example, the one or more internal batteries 160 and one or more supercapacitors 162 may be electrically coupled in parallel, where switches are used to selectively charge and/or discharge power thereto or therefrom. As will be described, the switches may be mechanical switches (e.g., relays) or solid-state switches (e.g., transistors, such as a metal oxide semiconductor field-effect transistor (MOSFET)). The internal power supply 158 should be sufficiently rated to boost (jump start) a vehicle 106 coupled to an external battery 104. The internal battery 160 may be rated at least 3,000 mAh, more preferably at least 10,000 mAh. A battery booster 100 having a 12,000 mAh internal battery 160, for instance, may output 200 cranking amps/400 peak amps during the jump-start function, which is sufficient to start a vehicle 106, but higher power internal batteries are contemplated for larger vehicles and trucks. In another example, the battery booster 100 may have a 32,000 mAh internal battery 160, for instance, may output 500 cranking amps/1,000 peak amps during the jump-start function. In certain embodiments, the internal battery 160 may comprise a plurality of electrically coupled batteries (e.g., connected in parallel, or when multiple lower voltage batteries are to be summed, in series).

The internal battery 160 may be a rechargeable lithium battery for outputting a direct current (DC) voltage. Example lithium battery chemistries include lithium iron phosphate ($LiFePO_4$), lithium polymer (Li-poly), lithium-cobalt oxide ($LiCoO_2$), lithium-titanate, lithium-nickel manganese cobalt oxide ($LiNiMnCoO_2$ or NMC), lithium iron magnesium phosphate ($LiFeMgPO_4$), lithium-manganese oxide (LiMnO2), lithium ion manganese oxide ($LiMn_2O_4$, $Li2MnO_3$, or LMO), etc. The internal battery 160 need not be limited to a single battery or single battery cell. For example, lithium iron phosphate batteries typically have a nominal cell voltage of about 3.2V to 3.3V each, while lithium-titanate batteries have a nominal cell voltage of about 2.4 V. Accordingly, multiple lithium cells may be connected in series to achieve a desired nominal voltage for the internal battery 160. For example, where the nominal cell voltage is 3.2V to 3.3V, four cells may be connected to achieve a nominal voltage 12.8V to 13.2V for the internal battery 160.

Additional lithium cells may be connected in series to achieve a higher nominal voltage where desired. In fact, the nominal voltage of the internal battery 160 may be selected a function of the nominal voltage of the external battery 104. In certain aspects, the nominal voltage of the internal battery 160 may be matched to (e.g., about the same as) the nominal voltage of the intended external battery 104. For example, if the nominal voltage of the intended external battery 104 is 12 volts, the nominal voltage of the internal battery 160 may be set to around 12 volts. In one example, the internal battery 160 may comprise four battery cells connected in series, each having in a nominal cell voltage of about 3.2V to 3.3V (totaling 12.8V to 13.2V).

The nominal voltages of the external battery 104 and the internal battery 160 need not be matched (or similar). In fact, it can be advantageous to select a nominal voltage for the internal battery 160 that is greater than or otherwise exceeds the nominal voltage of the external battery 104 (e.g., by 15% to 50%, or at least 30%). One advantage of setting the voltage of the internal battery 160 higher than the intended external battery 104 is the reduction is current requirements for the internal battery 160 during a jump start. That is, a battery with a higher nominal voltage can output a larger amount of power at a given current than a battery with a lower voltage at the same current.

In one example, where the nominal voltage of the intended external battery 104 is 12 volts, the nominal voltage of the internal battery 160 may be set to around 16 volts. Where an internal battery 160 with a nominal voltage of 16 volts is desired, the internal battery 160 may comprise five battery cells connected in series, each having in a nominal cell voltage of about 3.2V to 3.3V. In this example, the nominal voltage of the internal battery 160 may be 33.34% higher than the nominal voltage of the external battery 104. However, the nominal voltage of the internal battery 160 may be greater than the nominal voltage of the external battery 104 by a different percentage, including for example, 10 to 50%, more preferably 20 to 40%.

In another example, the nominal voltage of the intended external battery 104 is 24 volts, while the nominal voltage of the internal battery 160 may be set to around 32 volts. In yet another example, the nominal voltage of the intended external battery 104 is 48 volts, while the nominal voltage of the internal battery 160 may be set to around 64 volts. An increased nominal voltage enables the internal battery 160 to expend additional power without dropping below a voltage (or power) necessary to jump start a vehicle 106. For example, the excess power afforced by the internal battery 160 may be used to pre-charge the external battery 104 and/or preheat the external battery 104 or internal battery 160, thereby making is easier to jump start the vehicle 106. As will be discussed, pre-charging the external battery 104 can increase efficiency of the battery booster 100.

A supercapacitor 162, or another storage capacitor, may be used (whether alone or in addition to the internal battery 160) to supply a large amount of power that is sufficient time to jump start a vehicle 106. The supercapacitor 162 may be a single supercapacitor 162 or a bank of supercapacitors. For example, a plurality of supercapacitors may be coupled in parallel to aggregate the individual capacitors' capacitances. Supercapacitors 162 are useful in that, unlike batteries, they do not necessarily suffer from ageing and temperature problems. In general, a supercapacitor 162 can hold a very high charge that can be released relatively quickly, thereby making it suitable for jump starting a vehicle 106, since the vehicle 106 cranking operation lasts for a very short period of time during which high cranking power is required. Moreover, supercapacitors 162 are relatively small in size and can be employed in the battery booster 100 to provide sufficient cranking power to jump start a vehicle 106.

To charge the internal power supply 158 (or components thereof), the battery booster 100 may receive external power via a direct current (DC) input terminal 154 coupled to a DC power supply 156 and/or an alternating current (AC) input terminal 134 coupled to an AC power supply 148. AC power supply 148 may be wall current (e.g., 110 VAC), while the DC power supply 156 may be, for example, an automotive cigarette lighter (e.g., 12 VDC), a USB port (i.e., 5 VDC), etc. In certain aspects, one of the plurality of DC output terminals 136 may serve as both a DC input terminal 154 and a DC output terminal 136. That is, the battery booster 100 may draw power from a device coupled to the DC output terminals 136 (functioning as a DC input terminal 154), or supply power to the device coupled to the DC output terminals 136 (functioning as a DC output terminal 136). For example, the battery booster 100 may draw a charging current to charge the internal power supply 158 from a vehicle 106 alternator via the DC booster output 136a (through the set of battery clamps 168, for example). In another example, the battery booster 100 may draw a charging current to charge the internal power supply 158 from a power source coupled to the first DC accessory output 136b, the second DC accessory output 136c, etc.

To convert the AC power supply 148, an AC-to-DC transformer may be provided, which may be integral with, or external to, the battery booster 100. An AC-to-DC transformer may removably coupled with wall current (i.e., line current) and/or removably coupled to the battery booster 100. In certain aspects, a power inverter and AC output terminal may be provided to output an AC voltage (e.g., a 110 VAC output). In such an embodiment, power from the DC power supply 156 or the internal battery 160 may be processed (e.g., using a DC-to-AC inverter) and used to supply the AC voltage to the AC output terminal.

In operation, when the AC power supply 148 or DC power supply 156 is unavailable (e.g., disconnected, out of service, when a circuit breaker is blown, the battery booster 100 is otherwise disconnected, etc.), the battery booster 100 may draw the power needed to operate the components of the battery booster 100 from the external battery 104 and/or internal power supply 158, thereby enabling the user to determine the status of the battery booster 100 (and state of charge, or other parameters, of the external battery 104) when the AC power supply 148 and the DC power supply 156 are unavailable. To that end, the battery booster 100 may report a power supply failure (e.g., as an alert) to one or more portable electronic devices 152 (e.g., phones, tablet computers, portable computers, or other handheld terminals) within a battery monitoring network via a communication network 170.

The battery booster 100 may further include an input/output interface 126 that interfaces the processor 128 with one or more peripheral and/or communicative devices, such as a user interface 138, a Global Positioning System (GPS) transmitter 140, a wired link 142, a wireless device 144, a microphone 150, and a speaker 124, which may be used to signal an alert (e.g., charge complete, error, etc.) or other status information. As illustrated, the processor 128 may be operatively coupled to a display device 114 via a display driver 116.

The display device 114 may comprise, or otherwise employ, one or more light emitting diodes (LEDs) and/or a liquid crystal display (LCD) screen. The LCD screen may be an alphanumeric segmented LCD display, or a matrix LCD display, such as those used on portable electronic devices. In certain embodiments, the LCD screen may further provide touch screen functionality to facilitate user input device via a thin layer of sensing circuitry present either beneath the visible portion of a surface of the display device 114, or as part of a thin, clear membrane overlying the display device 114 that is sensitive to the position of a pen or finger on its surface. In certain aspects, the battery booster 100 may employ multiple display devices 114. For example, a first display device 114 may be provided on the first housing 102a, while a second display device 114 may be provided on the second housing 102b. The first and second display devices 114 provide redundant information and/or function-specific information. For example, when the second housing 102b houses components of the battery booster 100 that are specific to a jump-start function, the second display device may be specific to the jump-start function.

In operation, the display driver 116 may receive display data from the processor 128 via input/output interface 126 and display the display data via the display device 114. For example, interactive display device 114 may be provided on the housing to provide the user with status information and/or input capability (e.g., via a touch screen or voice commands using, for example, wave files). Reminders, or other information (e.g., status information), may be displayed to the user, via the display device 114, as a scrolling message or menu structure (e.g., a graphical user interface (GUI)).

With regard to the internal data storage device 122, example flash memory devices include, for example, memory cards, such as RS-MMC, miniSD, microSD, etc. The internal data storage device 122 can function as an external hard drive or flash drive, thereby enabling the user to store digital files to the battery booster 100. In instances where the internal data storage device 122 is removable, as is the case with memory cards, the user can interchange, upgrade, or remove the memory card (e.g., if the battery booster 100 becomes defective) to avoid data loss. The display device 114 may be used to display, for example, the contents of the internal data storage device 122, the remaining storage capacity (e.g., as a percentage or in terms of available bytes), and, in certain aspects, the digital files themselves (e.g., photos may be displayed, files accessed, etc.). In certain aspects, in addition to (or in lieu of) charging a portable electronic device (e.g., a smart phone), the battery booster 100 may back up digital content stored to the portable electronic device 152 when the portable electronic device 152 is coupled to the battery booster 100 via, for example, a DC output terminal 136 that is a USB port.

When an external battery 104 is connected to the DC booster output 136a (e.g., via a set of battery clamps 168), the display device 114 may display the voltage of the external battery 104. The display device 114 may also indicate the state of charge of the external battery 104 in terms of percent of charge of the internal battery 160. During user inactivity, such as when charging the external battery 104 or the internal battery 160, the display device 114 may enter a sleep mode and will not display any messages until activity is detected (e.g., when devices are connected/disconnected from the battery booster 100 or the user interface 138 is actuated). As discussed below, if the voltage of the external battery 104 voltage is too low to detect across the DC booster output 136a, the display device 114 may remain blank and the voltage will not display, but a manual start procedure may be selected to enable the jump-start function (i.e., an override). The jump-start function may be used to start a vehicle 106 having an external battery 104 (e.g., a depleted automotive battery). The jump-start function causes the battery booster 100 to output a boosting current (e.g., 400+ peak amperes/200+ cranking amperes) via clamps coupled to the DC output terminal 136. One of skill in the art, however, would recognize that the internal battery 160 may be replaced with a higher capacity battery to facilitate higher output currents. Similarly, the supercapacitor 162 may be discharged into the external battery 104 (e.g., together with the internal battery 160).

In one example, once an AC power supply 148 (or DC power supply 156) is connected, a first LED of the display device 114 may be illuminated to indicate that the internal battery 160 of the battery booster 100 is charging. When the battery booster 100 is fully charged, a second LED on the unit may be illuminated. Finally, when the DC output terminal 136 is properly coupled to external battery 104 (e.g., clamped or otherwise electrically coupled), a third LED may be illuminated. Rather than employing separate LEDs, an LCD display or a single multi color LED may be employed that changes color depending on the status of the battery booster 100. The battery booster 100 may be further equipped with a light 108, which may function as a map light, flashlight, emergency light, etc. The light 108 may be activated and deactivated via user interface 138, such as a button, switch, etc. The light 108 may be an LED that outputs, for example, 15 to 1,000 lumens.

When an LCD display is employed as the display device 114, the display device 114 may be configured to display, in addition to, or in lieu of, the LEDs, a number of messages to indicate the current status, or operation of the battery booster 100 to the user. In selecting the message(s) to display, the battery booster 100 measures one or more parameters of the internal battery 160, external battery 104, or of the battery booster 100. Parameters include, for example, voltage, power capacity, temperature, connection status, etc.

The user interface 138 may be used to enable the user to switch the output charge amperage (e.g., 1 A, 10 A, 50 A, 100 A, etc.) or another setting (e.g., charge, boost, other). Example user interface 138 devices may include, for example, physical buttons, physical switches, a digitizer (whether a touch pad, or transparent layer overlaying the display device 114), voice command (e.g., via the microphone 150 and speaker 124), and other input devices. For instance, using the digitizer, a user may control or interact with the battery booster 100 by writing or tapping on the display device 114 using, a pen, stylus, or finger. In certain aspects, as will be described below, the user interface 138, or a portion thereof, may be remotely situated and coupled to the battery booster 100 over a communication network 170 (e.g., as part of a remote interface device 172, such as a mobile application).

The GPS transmitter 140 may be used to track and/or monitor the location of the battery booster 100 and to relay the location information in the form of positional data (e.g., geographic coordinate system data or Internet Protocol (IP) address) to a booster management server or another device in battery charging system or via a communication network 170. For example, a computer may be configured to track the activities, location, and/or charge history of a particular battery booster 100 in a battery charging system. The positional data may also be locally stored to the battery booster 100 (e.g., to internal data storage device 122).

The wireless device 144 may be configured to manage communication and/or transmission of signals or data between the processor 128 and another device (e.g., the remote interface device 172 via a communication network 170 or directly with a remote interface device 172) by way of a wireless transceiver. The wireless device 144 may be a wireless transceiver configured to communicate via one or more wireless standards such as Bluetooth (e.g., short-wavelength, Ultra-High Frequency (UHF) radio waves in the Industrial, Scientific, and Medical (ISM) band from 2.4 to 2.485 GHz), near-field communication (NFC), Wi-Fi (e.g., Institute of Electrical and Electronics Engineers' (IEEE) 802.11 standards), etc. For example, wireless connectivity (e.g., RF 900 MHz or Wi-Fi) may be integrated with the battery booster 100 to provide remote monitoring and control of the battery booster 100 via one or more portable electronic devices 152. Using a wireless device 144, a user may be able to start and/or stop the charge cycle of the battery booster 100 or otherwise change the settings.

In certain aspects, a wired link 142 may be provided to manage communication and/or transmission of signals or data between the processor 128 and another device via, for example, a data port 146 (e.g., RS-232, USB, and/or Ethernet ports) capable of being wiredly coupled with another data port 146 positioned outside the battery booster 100 housing. As noted above, a USB port or 12V supply may be provided as DC output terminals 136 on the charger to facilitate the charging of accessories, such as portable electronic devices 152. Thus, the internal battery 160 of the battery booster 100 may also be used as a power source for one or more DC accessories. Charging while operating the accessories can extend run time of the battery booster 100, but will also extend recharge time. If the load exceeds the charging input amperage (e.g., 1 A), however, the accessory being charged may discharge the internal battery 160.

The DC accessory output port (e.g., first DC accessory output 136*b*, the second DC accessory output 136*c*) may be a USB port that may provide, for example, 5 VDC at one or more amperages, including for example, 1.0 A, 2.1 A, 3.0 A, etc. To activate a DC accessory output port, a power button (or other user selectable element) may be provided via user interface 138. The DC accessory output port may be activated by pressing the power button, and disabled by, for example, pressing the power button a second time, two or more times in quick succession, or held for a predetermined period of time. In other aspects, the DC accessory output port may be a 12 VDC power supply configured to output, for example, up to 12 VDC at 6.0 A.

The battery booster 100 may further comprise a plurality of sensors to provide measurement data descriptive of the surrounding environment. In certain aspects, the DC accessory output port may automatically shut off when no load is detected (e.g., after 5-10 minutes of a no load state). The DC booster output 136*a*, however, may remain active until the battery booster 100 reaches a low battery state (e.g., the charge level of the internal battery 160 is less than a predetermined threshold). The DC accessory output port may provide a nominal voltage to match the external battery 104 (e.g., 12 VDC) and used to supply power to an integrated or remotely situated air compressor (e.g., for tire inflation). Matching (or exceeding) the nominal voltage of the external battery 104 may further enable the DC accessory output port or DC booster output 136*a* to function as a memory saver to the vehicle 106 (e.g., via an on-board diagnostics (OBD) port, cigarette lighter, etc.), thereby obviating the need to reprogram the vehicle 106 when the external battery 104 is disconnected or removed. In certain aspects (e.g., in a 12-volt automotive system), the DC accessory output port may be limited to 12 VDC at 6.0 A with over current protection. In certain aspects, a user may wish to check the status of the internal power supply 158, such as the charge status/level of the internal battery 160 or the supercapacitor 162. To do so, a button (or other user selectable element) may be provided via user interface 138 that causes the status(es) to be displayed on the display device 114. To ensure accuracy of the measurement, the user may be instructed (e.g., via display device 114) to disconnect or turn off the battery booster 100 before actuating the button (or displaying the charge level). In one aspect, the display device 114 can show the percent of charge (or an icon indicating the same) for the internal battery 160 and/or the supercapacitor 162. For example, the display device 114 may display "100%" (or a solid battery icon) when the internal battery 160 is fully charged.

The battery booster 100 may include sensors 188 (e.g., a temperature sensor, humidity sensor, etc.), configured to monitor itself or other appliances or devices, either directly (e.g., using sensors 188) or wirelessly (e.g., using Wi Fi). The processor 128 may be configured to monitor, via one or more sensors 188 (whether local or remotely located), a temperature of the internal battery 160 or the external battery 104. In another example, the battery booster 100 may be configured to charge and monitor, in addition to automotive batteries, one or more portable electronic devices 152 being charged by said battery booster 100. The battery booster 100 may then charge or boost the external battery 104 as a function of the temperature or humidity of the environment or of the battery booster 100. For example, as will be disclosed the battery booster 100 may be used to pre-charge and/or pre-heat the external battery 104 and/or internal battery 160 in cold weather. Another temperature sensor may be provided to measure the temperature of the internal battery 160, the external battery 104, or another battery being charged (e.g., a lithium-ion battery of a portable electronic devices 152). If the measured temperature deviates from an operating range (i.e., a range in which the measured value is acceptable), the charging or boosting operating may be prohibited.

Figure 1C:
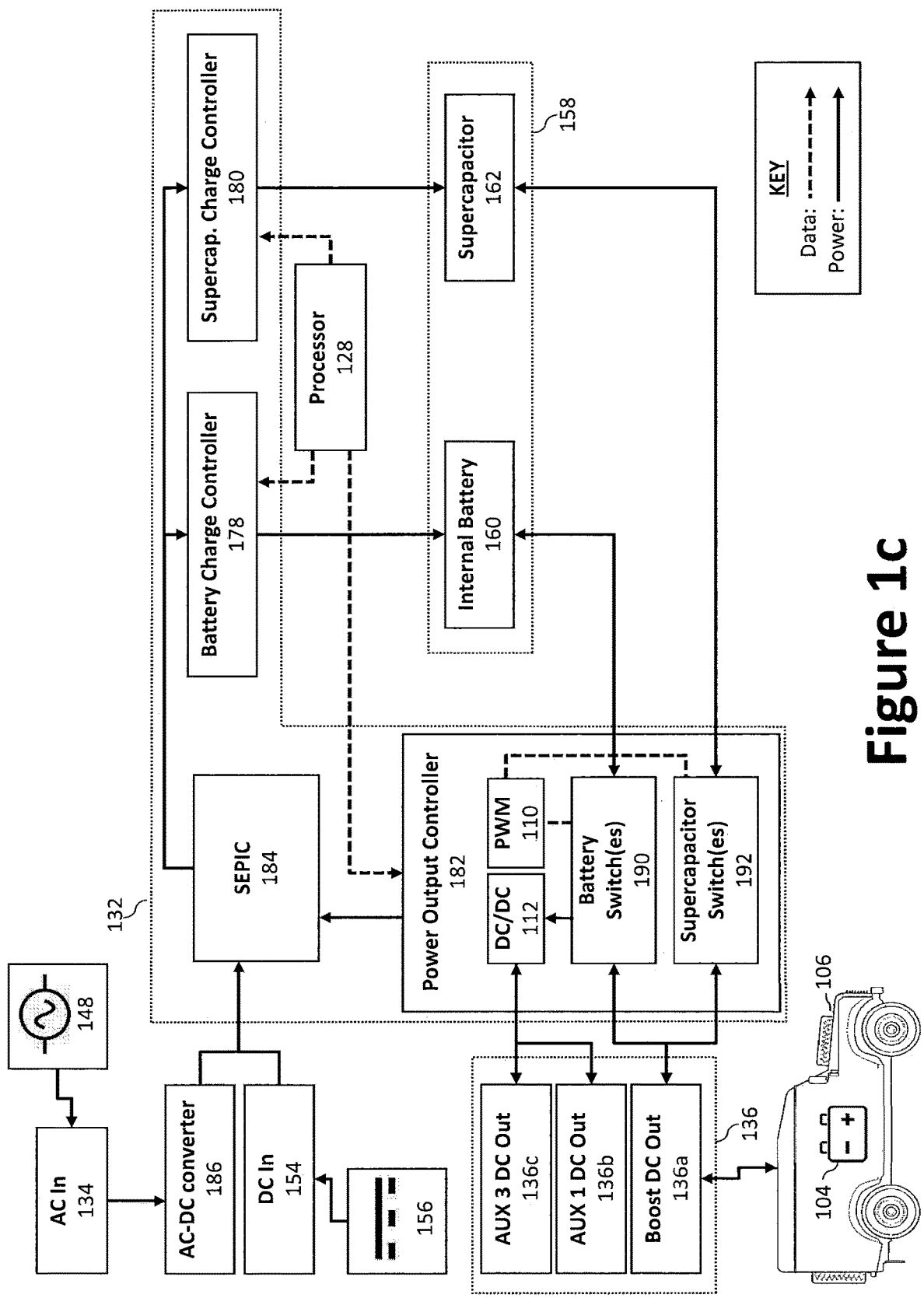
FIG. 1c illustrates a schematic diagram of an example battery booster.

With reference to FIG. 1c illustrates a schematic diagram of an example battery booster 100. As illustrated, a power-management circuit 132 may be used to manage power needed to operate the battery booster 100 (and components thereof), start an engine, and to charge the external battery 104, portable electronic devices 152, or other device via a DC output terminals 136. The power-management circuit 132 may comprise a battery charge controller 178, a supercapacitor charge controller 180, power output controller 182, and a single-ended primary-inductor converter (SEPIC) circuit 184. In certain aspects, a SEPIC circuit 184 may be coupled to the DC input terminal 154 or the AC input terminal 134 (e.g., via a AC-to-DC converter 186) and used to charge the internal power supply 158 (e.g., via the battery charge controller 178 and the supercapacitor charge controller 180).

The SEPIC circuit 184 is a form of DC-to-DC converter that allows the electrical potential (voltage) at the output of the SEPIC circuit 184 to be greater than, less than, or equal to that at its input. The output of a SEPIC circuit 184 is controlled by the duty cycle of a control transistor. In other words, a SEPIC circuit 184 exchanges energy between capacitors and inductors in order to convert a variable input voltage (e.g., from the DC input terminal 154 or the AC-to-DC converter 186) to a predetermined output voltage that can be used to charge the internal power supply 158, for example. The amount of energy exchanged is controlled by a switch, which may be a transistor such as a MOSFET.

As a result, a SEPIC circuit 184 enables a wide variation in input voltage both substantially higher and lower than the charge voltage of the internal power supply 158. For example, to charge a battery with a nominal voltage of 12 volts to 14.4V, the variable input voltage can be a voltage from a predetermined range, such as between 5 VDC to 20 VDC, thereby enabling internal battery 160 recharging functionality via a USB port, which is typically 5 VDC. That is, the input voltage may not be always known, but the predetermined range may be known. In certain aspects, the SEPIC circuit 184 may be shut off (e.g., bypassed) to facilitate a higher efficiency charge. For example, if a 20V power supply is used, the battery booster 100 may bypass the SEPIC circuit 184 (e.g., via a switchable shunt), whereas, if 12 VDC power supply (e.g., a vehicle charger accessory) is used, the SEPIC circuit 184 may be employed.

The battery charge controller 178 can be used to charge the internal battery 160 selectively, while the supercapacitor charge controller 180 can be used to charge the supercapacitor 162 selectively. Conversely, the power output controller 182 can be used to discharge the internal battery 160 and/or the supercapacitor 162 selectively into the external battery 104, engine, or another load to be charge/boosted/started. The battery charge controller 178, the supercapacitor charge controller 180, and the power output controller 182 may be controlled selectively by one or more processors 128, for example, in accordance with instructions (e.g., software algorithms) stored to a memory device.

The DC power may be output to the external battery 104 or other devices by way of a DC output terminal 136 (e.g., battery electrical conductors 166, battery clamps 168, etc.). Thus, power-management circuit 132 and processor 128 may control the charging operation of the external battery 104 to provide charging, maintaining, and, the jump-start function. While the power-management circuit 132 and processor 128 are illustrated as separate components, one of skill in the art would appreciate that power management functionality (e.g., battery charging, battery maintaining, etc.) may be provided as a single component that combines the functionality of the power-management circuit 132 and processor 128.

The power output controller 182 may comprise, for example, one or more battery switches 190, one or more supercapacitor switches 192, one or more DC-to-DC converters 112, and a pulse width modulation (PWM) driver 110. The output power may be controlled by switches and software. The one or more battery switches 190 may be selectively controlled to output DC power from the internal battery 160 to one or more of the DC output terminals 136, while the one or more supercapacitor switches 192 may be selectively controlled to output DC power from the supercapacitor 162 to one or more of the DC output terminals 136 (e.g., the DC booster output 136*a*). The battery switch(es) 190 and/or supercapacitor switch(es) 192 may be controlled via the processor 128 and/or the PWM driver 110. The speed (i.e., duty cycle) at which the battery switch(es) 190 and/or supercapacitor switch(es) 192 may be switches (i.e., opened and closed) can be controlled via the PWM driver 110.

The one or more battery switches 190 and the one or more supercapacitor switches 192 may be selectively controlled as a function of one or more parameters, such as maximum current over time, maximum temperature of battery, maximum time alone and/or minimum voltage (with or without time). Thus, when a parameter value is exceeded (or a requirement isn't met), the output voltage may be shut off. The battery booster 100 may include the ability to sense, or otherwise detect, that a battery (or other load/power supply) is coupled to the battery clamps 168. When a battery is not detected, the power may be shut off; however, the user may be provided with a manual override option (e.g., by holding a button for a predetermined amount of time, such as 2 to 10 seconds, or about 5 seconds). In certain aspects, the battery booster 100 may not charge an external battery 104 when the external battery 104 is too hot or cold, thereby avoiding potential hazards, and maintaining efficiency.

When the desired nominal voltage of the boost current at the DC output terminals 136 (e.g., the DC booster output 136*a*) is the same as the nominal voltage of the internal battery 160, a DC-to-DC converter may be omitted. When the desired nominal voltage at the DC output terminals 136 (e.g., first DC accessory output 136*b*, the second DC accessory output 136*c*, etc.) is different than the voltage a DC-to-DC converter 112 may be used to adjust the voltage. For example, when the nominal voltage of the internal battery 160 is 16-volts DC and the first DC accessory output 136*b* is a 5-volt USB port, the DC-to-DC converter 112 may convert the voltage of the power received from the internal battery 160 via the battery switches 190 from 16 volts to 5 volts.

While not necessarily illustrated in FIG. 1*c*, power from the internal power supply 158 or the power-management circuit 132 may be allocated to the other components, including, inter alia, the processor 128, input/output interface(s) 126, etc. For example, AC power may be drawn from an AC power supply 148, converted to DC power (via AC-to-DC converter 186), and used to charge the external battery 104 and/or the internal power supply 158. For instance, the battery booster 100 may be removably coupled with an AC power supply 148 located outside the housing 102 or housings 102*a*, 102*b* (e.g., a wall outlet) via an AC input terminal 134 and an AC-to-DC converter 186. In such an example, an AC wall charger may receive 120 VAC from an electrical wall outlet and output, via an inverter, 12 VDC (or another desired DC voltage) to the input socket (e.g., DC input terminal 154) of the battery booster 100.

DC input power can be received from a DC power supply 156 via DC input terminal 154, or either AC power supply 148 via an AC-to-DC converter 186. The DC input power is received by SEPIC circuit 184 and output to the internal battery 160 and/or the supercapacitor 162, in parallel, via an internal battery charge controller 178 and a supercapacitor charge controller 180, respectively. The internal battery charge controller 178 and a supercapacitor charge controller 180 may be used to monitor the parameters of the internal battery 160 and the supercapacitor 162, such as the charge level or status. The supercapacitor 162 and internal battery 160 may receive charging current from the DC input power.

The power-management circuit 132 and processor 128 may facilitate reverse hook-up protection, as well as automatic nominal battery voltage detection. The battery booster 100 may further include the ability to sense the occurrence of a manual override, and, if voltage is still zero after engine start, the user may be instructed to check and replace the external battery 104 of the vehicle 106. Further, an automatic shut-off function may be provided if a battery/load/power supply is not attached to the battery clamps 168 within a predetermined amount of time (e.g., about 1 to 60 minutes, more preferably about 1 to 30 minutes, most preferably about 1 to 15 minutes). The battery booster 100 may further preheat a cold battery by, for example, running amperes though the battery, or an internal heater. The battery booster 100 may further employ alternate power sources, such as a solar panel to enable battery maintaining and charging, as well as data monitoring through solar panels (e.g., one or more 12-14 Watt panels). For example, solar cells may be used to charge or maintain fleet vehicles, such as vehicle dealership fleets, rental vehicles fleets, etc.

To use the jump-start function, the DC output terminal 136 may be coupled to the external battery 104 (i.e., the battery to be charged/jumped, whether directly or indirectly) and the user interface 138 may be used to activate the boost feature. The jump-start function may also be selected by a user via a remote interface device 172 over a communication network 170.

If the battery booster 100 is performing another function when the jump-start function is selected, the display device 114 may indicate that the jump-start function cannot be performed at this time. If the battery clamps 168 are improperly connected (e.g., reverse polarity or disconnected), an aural alarm may sound, and the display device 114 may display a warning message, such as "Warning—Reverse Polarity" or "Warning—Battery Disconnected." Conversely, if the battery clamps 168 are properly connected and the battery booster 100 is ready for use, the display device 114 may display a standby message, such as "Jump Start Ready."
If the jump-start function of the battery booster 100 is attempted twice within a predetermined time period (e.g., a minute), the jump-start function may be prohibited until the battery booster 100 has cooled down. During the cool down period, the display device 114 may display a cool down message, which may also indicate the remaining time for the cool down period.

If the voltage of the external battery 104 is too low for the battery booster 100 to detect that the battery clamps 168 are connected, a manual start procedure (e.g., the manual override) may be selected to enable the jump-start function. To use the manual start procedure, the DC output terminal 136 may be coupled to the external battery 104 and the user interface 138 may be used to activate the boost feature. For example, the same button may be used to trigger the jump-start function, but instead of a momentary press, the button may be pressed and held for a predetermined period of time (e.g., about 2 to 10 seconds, more preferably about 2-5 seconds) until the display device 114 displays the standby message. In certain aspects, the manual start procedure may override safety features to ensure that power is delivered regardless of connection status, in which case the battery booster 100 may energize the battery clamps 168 and cause sparking if they are touched together (i.e., shorted).

There are a number of ways in which the internal power supply 158 may be charged. The user may also charge the internal battery 160 while driving via the DC input terminal 154 (e.g., using a 12 VDC car charger that couples to the cigarette lighter). Accordingly, a 12 VDC input socket may be used to recharge the battery booster 100 to a point where the internal power supply 158 is charged. The battery booster 100 may then be used to jump start a vehicle 106 having an external battery 104. In certain aspects, the battery booster 100 may be charged through the battery clamps 168, which may be retractable and/or configured to be housed in a recess of the housing 102 of the battery booster 100. For example, charging may be accomplished by leaving the relay closed, thereby allowing the alternator in the vehicle 106, which can provide up to 70A, to rapidly charge the internal battery 160. Thus, the battery booster 100 may be configured to sense the current in a bidirectional manner through the battery clamps 168 (e.g., (1) to measure current going from the battery booster 100 into the external battery 104, and (2) from the external battery 104 into the battery booster 100). To prevent overheating when current is passing into the battery booster 100, a temperature sensor may be coupled to the battery booster 100, whereby the relay is shut off if the battery booster 100, or the internal battery 160, reaches a predetermined shut-off temperature threshold. Indeed, a benefit of maximizing the amount of current going back into the battery booster 100 is that it yields a faster charge.

While the power output controller 182 serves to provide power from the internal power supply 158 to the DC output terminals 136, the power output controller 182 may also be configured to back-feed power from the DC output terminals 136 to the internal power supply 158, whether directly to the internal power supply 158 or via the SEPIC circuit 184. In an example operation, the SEPIC circuit 184 may draw current from the depleted external battery 104 (e.g., via the power output controller 182), which could be used to charge the internal power supply 158, or portion thereof. For example, a depleted external battery 104 can typically charge the supercapacitor 162; therefore, when DC input power is unavailable at the DC input terminal 154 and the AC-to-DC converter 186, for instance, the supercapacitor 162 may receive charging current from external battery 104 via the SEPIC circuit 184. By way of illustration, if an external battery 104 having a nominal voltage of 12 VDC has depleted to 6 VDC, the external battery 104 may be unable to start a vehicle 106, but a portion of the remaining power may be drawn from the depleted external battery 104 and used to charge the supercapacitor 162, which could then be used to boost the vehicle 106.

When a supercapacitor is simply coupled to a depleted battery (e.g., external battery 104), the finite energy reserve is drained into the depleted battery, often lowering the voltage of the supercapacitor 162 to a level that cannot start an engine. While an internal battery 160 can start an engine when it has sufficient power to override the discharging effects of a depleted vehicle battery, the peak current that an internal battery 160 can supply may be limited due to the temperature (i.e., in cold weather) that can affect the chemical reaction inside the jump starter battery. This limit in peak current may be such that the engine may not turn over. Therefore, both an internal battery 160 and a supercapacitor 162, where the internal battery 160 cannot supply sufficient current to overcome the effects of the depleted external battery 104, while the supercapacitor 162 may supply the peak current.

A battery (e.g., the internal battery 160, a small lithium battery, etc.) may be used in combination with the supercapacitor 162 to prevent the supercapacitor 162 from discharging the current back to the depleted external battery 104 until the battery booster 100 may determine that the user trying to start the vehicle 106. For example, if a drop in current is detected at the DC booster output 136a, the processor 128 may determine that the user is attempting to start the vehicle 106 and the supercapacitor charge controller 180 may be instructed to electrically couple the supercapacitor 162 to the external battery 104 (via DC output terminal 136), thereby causing the supercapacitor 162 to quickly discharge into the external battery 104, thereby enabling the vehicle 106 to start. The processor 128 may be similarly configured to control the power output controller 182, which enables the internal battery 160 to discharge into the external battery 104.

Once the engine that coupled to the depleted external battery 104 has been started, the power from the alternator may back feed into the battery booster 100 and used to charge the internal power supply 158 (e.g., the internal battery 160 and/or the supercapacitor 162). As will be discussed, the amount and duration of power back-fed from the DC output terminals 136 to the internal power supply 158 may be controlled via the PWM driver 110, for example.

The internal battery 160 and a supercapacitor 162 can each be recharged by a SEPIC circuit 184, which may receive any input voltage between, for example, 5 VDC to 20 VDC. The internal battery charge controller 178 recharges the internal battery 160 inside the battery booster 100, while a supercapacitor charge controller 180 charges the supercapacitor 162. The supercapacitor 162 may also be recharged from the internal battery 160, thereby providing multiple peak current starts. The jump-start function is controlled by one or more processors 128 once the jump starter cables are attached to an external battery 104 and the jump-start function is engaged (either manually or automatically). The internal battery 160 may be connected by a circuit with one or more switches (relays, transistors, etc.) to the external battery 104 of the vehicle 106. The internal battery 160 transfers energy into the external battery 104 and when the vehicle ignition is actuated (e.g., the key is turned, or the start button is pressed), current drawn from the starter motor will cause a voltage drop across the jump starter connection leads. This voltage drop may be detected by the one or more processors 128, at which point the one or more processors 128 will electrically couple the supercapacitor in parallel with its internal battery 160 to supply the peak current required to start the engine. If the engine starts, the jump starter function is done and the battery booster 100 can recharge itself (e.g., the internal battery 160 and/or the supercapacitor 162) from an electrical connection to the electrical system of the vehicle 106, which may continue until the internal battery 160 and/or the supercapacitor 162 are fully charged. After which the battery booster 100 may shut off its charging function, or the battery clamps 168 are removed. If the vehicle 106 does not start, once the starter is disengaged the voltage on the external battery 104 will stabilize and the supercapacitor 162 will recharge from the internal battery 160 (or any available power from the external battery 104), and prepare for the next attempt to start the engine, whereby the process is repeated.

In lieu of battery clamps 168, the charger cables (e.g., battery electrical conductors 166) of the battery booster 100 may be fixedly coupled to the external battery 104 (e.g., via a bolt and ring terminals) and configured to quick connect to battery booster 100 (e.g., using quick connects/disconnect connectors). In certain instances, the quick connect connectors may not be compatible with different devices. Due to the inconvenience of disconnecting and reconnecting the fixedly coupled connections, it may be advantageous to use a charger cable that fixedly couples to the external battery 104 at one end, but provides a plurality of different connectors at the second end. For example, the first end may be fixedly coupled to a battery terminal through the ring terminals, while the second end may be provided with two connecters, namely (1) an EC5 (male) connector configured to couple with an EC5 (female) connector of the battery booster 100 and (2) a second (male) connector configured to couple with a second (female) connector of a battery charger/maintainer. One or more end caps may be further provided to protect the unused connector from dirt and debris. Such a charger cable would be of particular use for vehicles that are not often used and typically require jump starting. In other aspects, the charger cables of the battery booster 100 may be configured to quick connect to battery booster 100 using magnetic connectors. For example, the magnetic connectors may employ an electrical plug and receptacle that relies on magnetic force to maintain contact. A housing of the magnetic connectors may be physically shaped to ensure proper polarity when coupled (e.g., preventing the magnetic couplings from becoming coupled upside down). While two connectors are described, such a charger cable need not be limited to two connectors, nor should it be limited to the example connector types described.

In another alterative, the entire battery booster 100 may be permanently coupled to an external battery 104 or an electrical system of the vehicle 106 (e.g., installed under the hood or inside the vehicle). For example, the battery booster 100 may be fixedly coupled to the vehicle and remotely actuated using a physical button or controller (e.g., one positioned under the hood, on the dashboard, in the glove box, etc.), or wirelessly. When integrated with the vehicle, the housing 102 of the battery booster 100 may be fabricated to mitigate damage from engine temperature or engine fluids. Wireless control may be accomplished using, for example, a portable electronic device 152 that is communicatively coupled to the battery booster 100 via a communication network 170. For instance, a smart phone may wirelessly send a signal to the battery booster 100, either directly or through the electrical system of the vehicle 106, which causes the battery booster 100 to output boosting energy or charging energy to the external battery 104 of the vehicle 106. The wireless communication may employ one or more wireless standards such as Bluetooth (e.g., short-wavelength, UHF radio waves in the ISM band from 2.4 to 2.485 GHz), NFC, Wi-Fi (e.g., IEEE 802.11 standards), etc. When permanently coupled to the external battery 104 or electrical system of the vehicle 106, the battery booster 100 may charge the internal battery 160 when the vehicle 106 is running via the electrical system of the vehicle 106 (e.g., 12 VDC supply).

Figure 1D:
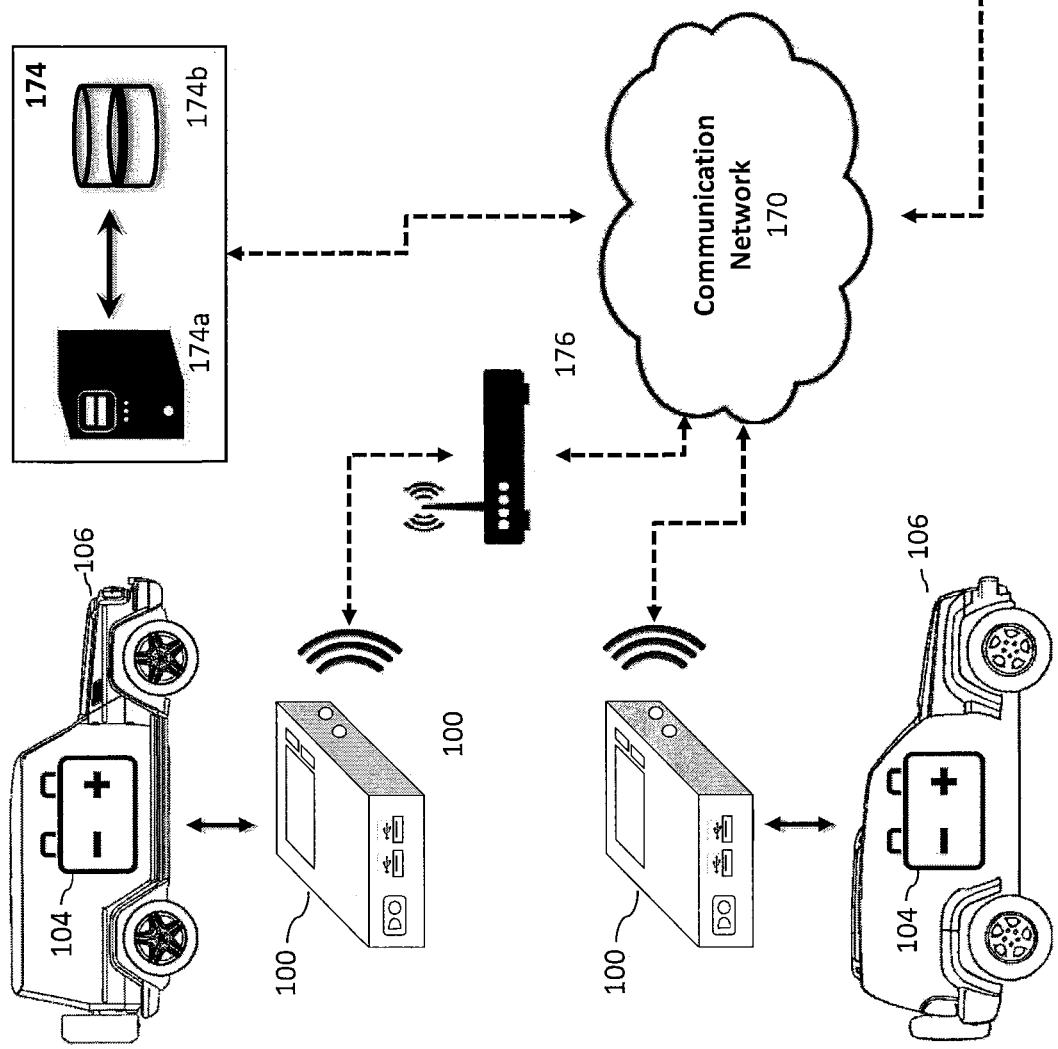
FIG. 1d illustrates a communication network for use with the battery booster.

FIG. 1d illustrates a communication network for use with the battery booster. As illustrated, the battery booster 100 may communicate with a remote interface device 172 via a communication network 170 or directly with a remote interface device 172. In operation, a user may control the battery booster 100, monitor live charging status updates, charging conditions, historic data, remotely update software and firmware, and stay connected with the battery booster 100 news and updates from the manufacturer via the communication network 170 and a booster management server 174. In certain aspects, an internal cellular modem may be implemented that utilizes standards-based wireless technologies, such as 2G, 3G, 4G, Code Division Multiple Access (CDMA), and Global System for Mobile Communications (GSM), to provide wireless data communication over worldwide cellular networks. An advantage of an internal cellular modem is that there is no reliance on a local network (e.g., wireless router, modem, etc.) of the user, thereby enabling communication between the battery booster 100 and communication network 170, even in the event of a total power failure in at the location of user. Therefore, one or more routers 176 (e.g., Wi-Fi routers, cellular towers, etc.) may be used to connect the battery booster 100 to the communication network 170.

The battery booster 100 may indicate to the user (e.g., via display device 114 or over a communication network 170) the number of ampere hours put into external battery 104, and/or an indication of the state of health of the external battery 104. For example, if customer inputs a battery size/model number, the battery booster 100 can use the battery capacity to provide the state of health. The battery booster 100 may indicate to the user the state of charge or health of the internal battery 160 (e.g., the number of coulombs) via display device 114. Indeed, the battery charging methods or techniques employed by the battery booster 100 can be any of a variety of charging techniques including conventional charging, fast charging, and the like. The battery booster 100 may be further configured to determine, automatically, different battery chemistry (e.g., AGM, gel, lithium ion, etc.) and the nominal voltage of the external battery 104. The charging characteristics of a battery charger may be configured to match the battery chemistry of the battery to be charged. For example, lead acid batteries may be charged with constant power, constant current, constant voltage, or combination thereof. Such batteries are known to be charged with both linear as well as switched-mode battery chargers. The identified battery chemistry and voltage may be displayed on display device 114.

Figure 2:
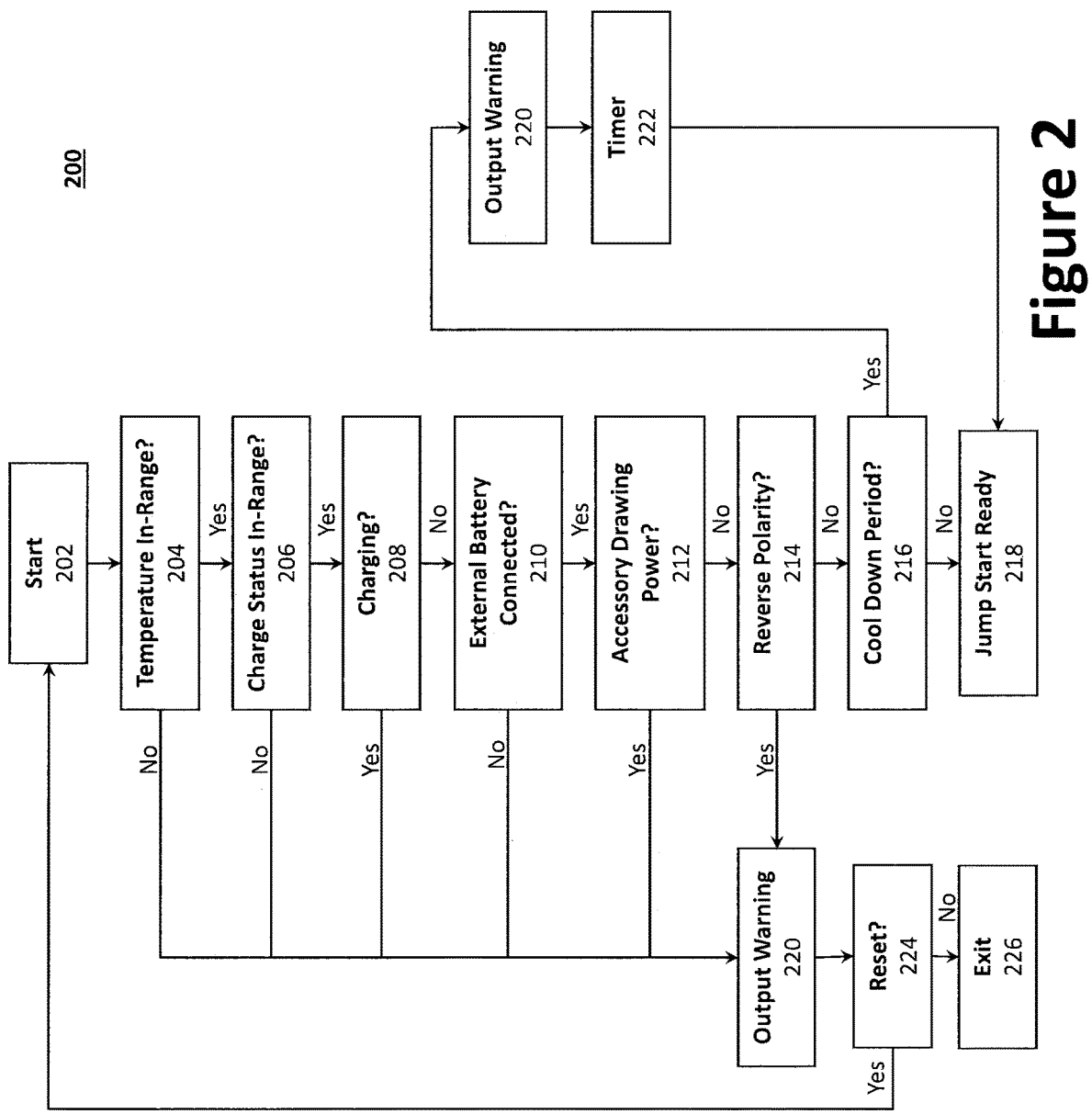
FIG. 2 illustrates a flow diagram of an example method for providing the jump-start function using a battery booster.

FIG. 2 illustrates a flow diagram 200 of an example method for providing the jump-start function using a battery booster 100. The process starts at step 202, which may be initiated by the user turning on the battery booster 100 or actuating a jump-start function button on the user interface 138. At step 204, the processor 128 of the battery booster 100 may determine, using one or more sensors, whether the temperature of the internal battery 160 is within an operating range. For example, if the temperature of the internal battery 160 exceeds a first predetermined shut-off temperature threshold, a warning may be provided at step 220 indicating that the internal battery 160 is too hot. Similarly, if the temperature of the internal battery 160 does not meet a first predetermined shut-off temperature threshold, a warning may be provided at step 220 indicating that the internal battery 160 is too cold. Otherwise, the process proceeds to the next step.

At step 206, the processor 128 of the battery booster 100 may determine whether the state of charge for the internal battery 160 is within an operating range. For example, if the state of charge of the internal battery 160 does not meet a predetermined charge level threshold, a warning may be provided at step 220 indicating that the internal battery 160 is not adequately charged. Otherwise, the process proceeds to the next step. In certain aspects, the battery booster 100 may provide the jump-start function even in the event the internal battery 160 is only partially charged, which may be satisfactory when the external battery 104 is nearly able to start the vehicle 106.

At step 208, the processor 128 of the battery booster 100 may determine whether the internal battery 160 is being charged. If the internal battery 160 is being charged, a warning may be provided at step 220 indicating that the internal battery 160 is being charged and cannot be used to provide the jump-start function. Otherwise, the process proceeds to the next step. In certain aspects, the battery booster 100 may provide the jump-start function even when the internal battery 160 is being charged.

At step 210, the processor 128 of the battery booster 100 may determine whether an external battery 104 is coupled to the battery booster 100 (e.g., via battery clamps 168 coupled to the DC output terminal 136). If no external battery 104 is detected (e.g., by measuring a voltage or resistance across the battery terminal, such as the DC booster output 136a), a warning may be provided at step 220 indicating that the external battery 104 is not detected. Otherwise, the process proceeds to the next step.

At step 212, the processor 128 of the battery booster 100 may determine whether an accessory is currently coupled to, or otherwise using, the battery booster 100 (e.g., via another DC output terminal 136, such as the first DC accessory output 136b, the second DC accessory output 136c, etc.). If an accessory is detected (e.g., by detecting a load or other current draw at an output terminal), a warning may be provided at step 220 indicating that the internal battery 160 is in use and should not be used to provide the jump-start function. Otherwise, the process proceeds to the next step. In certain aspects, the battery booster 100 may provide the jump-start function even when another DC output terminal 136 is in use.

At step 214, the processor 128 of the battery booster 100 may determine whether an external battery 104 is properly coupled to the battery booster 100. If a reverse polarity condition is detected for the external battery 104, a warning may be provided at step 220 indicating that the external battery 104 is improperly connected. Otherwise, the process proceeds to the next step.

At step 216, the processor 128 of the battery booster 100 may determine whether the battery booster 100 is in a cool down period. For example, as noted above, if the jump-start function of the battery booster 100 is attempted twice within a predetermined time period (e.g., a minute), the jump-start function may be prohibited until the battery booster 100 has cooled down (i.e., the predetermined time period has elapsed). Accordingly, if the jump-start function has been performed within a predetermined period of time, a warning may be provided at step 220 indicating a cool down message, which may also indicate the remaining time for the cool down period. After the predetermined time period has elapsed at step 222 (e.g., using a timer), the process may proceed to the next step.

At step 218, the battery booster 100 is ready to perform the jump-start function, whereby boosting energy may be output to the external battery 104 upon actuating the jump-start function button on the user interface 138, or automatically. The boosting energy may be provided for a predetermined period of time, before shutting off. For example, the boosting energy may be provided for 1 to 60 seconds, more preferably 5 to 30 seconds. As will be described in connection with FIG. 3, the battery booster 100 may further perform one or more other function prior to outputting a jump-start current. For example, the battery booster 100 may perform a pre-charge function. A pre-charge function may increase efficiency (or likelihood) of successfully jump starting a vehicle. For example, where the vehicle 106 comprises a diesel engine, the pre-charge function may be used to heat the glow plugs.

A warning may be provided at step 220 via one or more of a display device 114, a speaker 124, or to another device (e.g., a portable electronic device 152) via a communication network 170. The message may indicate to the user one or more statuses/conditions of the internal battery 160, external battery 104, and/or of the battery booster 100.

At step 224, the process may be reset such that the process is repeated. The reset feature may be manually triggered (e.g., via a button) or automatically once a predetermined condition is met. For example, if the temperature of the internal battery 160 is outside of the operating range, the system may be automatically reset once the temperature of the internal battery 160 returns to the operating range. If a reset is not selected at step 224, the processed exits at step 226.

In certain aspects, a manual override option may be selected (e.g., at any time) that causes the battery booster 100 to proceed to step 218 such that the battery booster 100 is ready to perform the jump-start function, regardless of the status of the internal battery 160, external battery 104, or of the battery booster 100. Further, the processor 128 of the battery booster 100 may determine whether the voltage of the internal battery 160 or the external battery 104 exceeds a predetermined threshold, in which case charging and/or boosting is prohibited to prevent overcharging.

Once the battery booster 100 is ready to perform the jump-start function (e.g., step 218 of FIG. 2), the processor 128 may control the power-management circuit 132 to selectively discharge the internal power supply 158 to one or more of the plurality of DC output terminals 136. The processor 128 may also control the power-management circuit 132 to charge the internal power supply 158 selectively via one or more of the plurality of DC output terminals 136.

Figure 3:
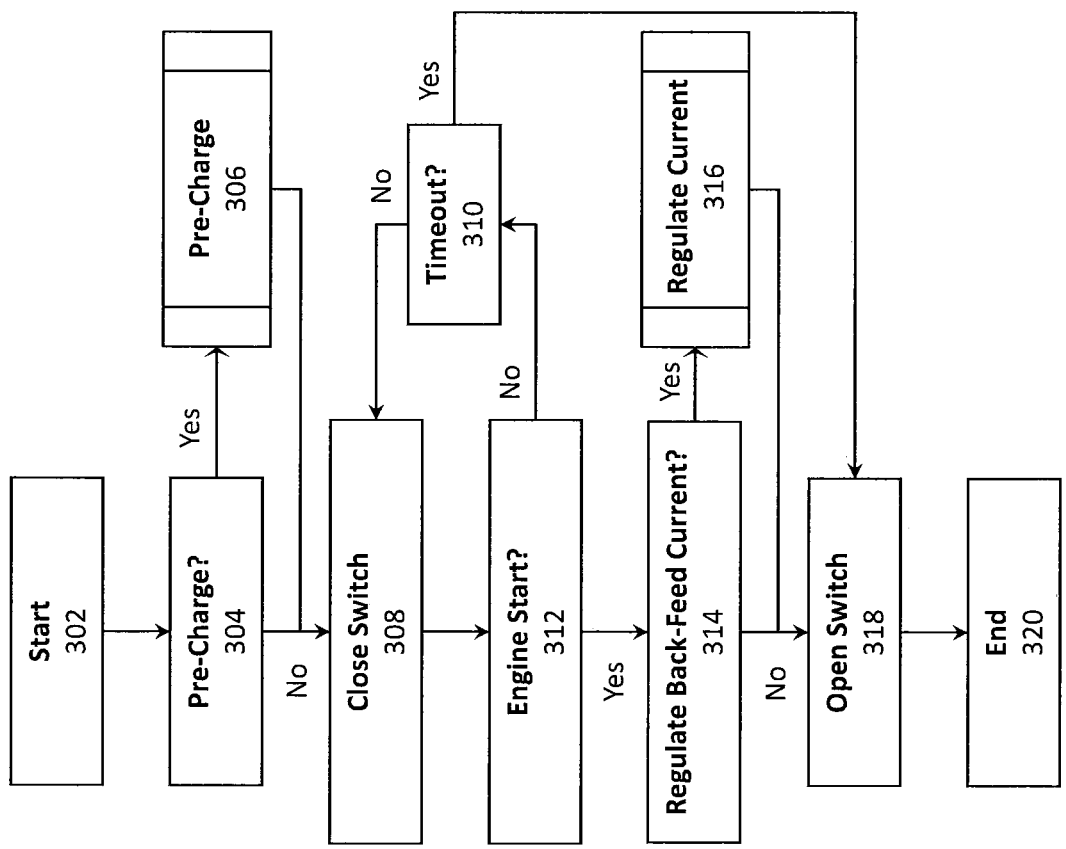
FIG. 3 illustrates a flow diagram of an example method for discharging and charging the battery booster.

FIG. 3 illustrates a flow diagram 300 of an example method for discharging and charging the battery booster 100 (e.g., during a jump-start function). Once the battery booster 100 is ready to perform the jump-start function, the process starts at step 302. For example, the jump-start function may be initiated by the user, turning on the battery booster 100, or actuating a jump-start function button on the user interface 138.

At step 304, the processor 128 may determine whether a pre-charge function is selected. The pre-charge function may be set via the user from the user interface 138 (or remote interface device 172). In certain aspects, the pre-charge function may be a default operation. If the pre-charge function is selected at step 304, the process proceeds to step 306, whereby the pre-charge function is performed before proceeding to step 308 (see FIG. 4). Otherwise, if the pre-charge function is not selected at step 304, the process may proceed directly to step 308.

At step 308, the battery booster 100 may, via processor 128, close one or more switches to provide the jump-start current to the external battery 104, for example, using a pair of battery clamps 168 coupled to the DC booster output 136a via battery electrical conductors 166. In operation, the processor 128 may selectively control (e.g., open or close) one or more switches in the power-management circuit 132 to pass the jump-start current from the internal power supply 158 to the DC booster output 136a. In one example, the one or more battery switches 190 may be selectively controlled to output DC power from the internal battery 160 to one or more of the DC booster output 136a, while one or more supercapacitor switches 192 may be selectively controlled to output (i.e., discharge) DC power from the supercapacitor 162 to the DC booster output 136a. In certain aspects, the battery switches 190 and supercapacitor switches 192 may be independently controlled. For example, the battery switches 190 may be actuated (closed) to transfer an amount of power from the internal battery 160 to the DC booster output 136a before actuating (closing) the supercapacitor switches 192 to discharge the supercapacitor 162 to the DC booster output 136a. In other aspects, the battery switches 190 and supercapacitor switches 192 may be simultaneously actuated, thereby simultaneously discharging the internal battery 160 and the supercapacitor 162 to the DC booster output 136a. In certain aspects, once the supercapacitor 162 has discharged to the DC booster output 136a, the supercapacitor switches 192 may be opened, at which point the supercapacitor 162 may be recharged (e.g., via the internal battery 160).

At step 312, the battery booster 100 may, via processor 128, determine whether the engine of the vehicle 106 coupled to the external battery 104 has started. For example, the processor 128 may detect a voltage spike using one or more sensors 188 (e.g., voltage or current sensors), which is indicative of the engine starting and driving the alternator of the vehicle 106.

The voltage spike generated when the vehicle 106 starts during a jump-starting operation can be harmful to the vehicle 106 (e.g., harmful to its onboard computers, electronics, entertainment system, etc.). That is, the combination of power from the battery booster 100 and power from the alternator can result in a power surge. To mitigate this voltage spike, the battery booster 100 may be configured with a current back-feed function to back feed power from the vehicle to the internal power supply 158. In other words, upon starting, the battery booster 100 may transform from a power source to a load, thereby absorbing the voltage spike.

At step 314, the processor 128 may determine whether a current back-feed function is selected. The current back-feed function may be set via the user from the user interface 138 (or remote interface device 172). In certain aspects, the current back-feed function may be a default operation. If the current back-feed function is selected at step 314, the process proceeds to step 316, whereby the current back-feed function is performed before proceeding to step 308 (see FIG. 5). Otherwise, if the current back-feed function is not selected at step 304, the process may proceed directly to step 318.

At step 318, the battery booster 100 may, via processor 128, open the one or more switches to discontinue supply of the jump-start current to the external battery 104. For example, in operation, the processor 128 may selectively control (e.g., open or close) one or more switches in the power-management circuit 132 to prohibit current flow between the internal power supply 158 and the DC booster output 136a. Once the switch is open and current flow between the internal power supply 158 and the DC booster output 136a is terminated, the process of discharging and charging the battery booster 100 may end at step 320.

FIG. 4 illustrates a flow diagram of an example pre-charge function (e.g., step 308). If the pre-charge function (e.g., step 308) is selected at step 304, the battery booster 100 may, via processor 128, close one or more switches to provide the pre-charge current to the external battery 104, for example, using the pair of battery clamps 168 coupled to the DC booster output 136a via battery electrical conductors 166. In operation, at step 402, the processor 128 may selectively control (e.g., open or close) one or more switches in the power-management circuit 132 to pass the pre-charge current from the internal power supply 158 to the DC booster output 136a.

At step 404, the processor 128 may regulated the pre-charge current. For example, the amperage of the pre-charge current may be lower than the jump-start current (e.g., 1 to 25 amps). The amperage may be adjusted or regulated via, for example, one or more converters. In another example, the battery booster 100 may, via processor 128, open and close the battery switches 190 at a predetermined frequency to achieve a duty cycle that provides a desired regulated pre-charge current from the internal battery 160 to an external battery 104 that is electrically coupled to the DC booster output 136a. In other aspects, the battery switches 190 may be fully closed for a predetermined period of time to couple the internal battery 160 directly to the DC booster output 136a, in which case the pre-charge current would be effectively a jump-start current for the predetermined period of time.

The pre-charge current, whether regulated or not, may be provided to the external battery 104 that is electrically coupled to the DC booster output 136a until a predetermined condition (e.g., a predetermined battery condition) is met at step 406. If the condition is met (i.e., a threshold is met), the process proceeds to step 410, otherwise, the process may proceed to step 408. The condition may relate to a voltage of the external battery 104, the amount of current (i.e., amperes) provided to the external battery 104, a temperature of the external battery 104, a temperature of the internal battery 160, a time duration, etc. For example, the pre-charge current may be provided to the external battery 104 until a predetermined threshold voltage, threshold temperature, threshold amperes, or time has elapsed. An advantage of the pre-charge function is that the temperature of the internal battery 160 will increase as the internal battery 160 discharges into the external battery 104. Increasing the temperature of the internal battery 160 to a predetermined temperature (e.g., in cold environments) improves discharge efficiency of the internal battery 160. In other aspects, the pre-charge function may continue until the voltage of the internal battery 160 equalizes with the voltage of the external battery 104. In certain aspects, the pre-charge current may be supplied as a function of the temperature of the environment. In one example, the processor 128 may collect temperature readings from one or more sensors 188, where the duration of the pre-charge function may be a function of the temperature. That is, a pre-charge current may be supplied for a longer period of time during the pre-charge function when the temperature (e.g., as reported by the sensors 188) is low.

If the condition is met at step 406, the battery booster 100 may indicate that the pre-charge operation is completed at step 410. The indication may aural or visual (e.g., illuminating a light, displaying text, displaying an icon, etc.) and be provided via, for example, a display device 114, a speaker 124, or another device (e.g., a portable electronic device 152) via a communication network 170. The process may then proceed to step 308.

If the condition is not met at step 406, the battery booster 100 may determine whether a timeout condition exists at step 408. For example, the power-management circuit 132 may be configured to pass the pre-charge current from the internal power supply 158 to the DC booster output 136a for only a predetermined amount of time. The predetermined amount of time may be, for example, 1 second to 300 seconds. If the predetermined amount of time has not yet elapsed at step 408, the process may return to step 402. If the predetermined amount of time has elapsed at step 408, the process may proceed to step 412.

At step 412, the battery booster 100 may indicate that the pre-charge operation has failed. The indication may aural or visual and be provided via, for example, a display device 114, a speaker 124, or another device (e.g., a portable electronic device 152) via a communication network 170. The process may then proceed to step 318, where the battery booster 100 may, via processor 128, open the one or more switches to discontinue supply of the jump-start current to the external battery 104.

FIG. 5 illustrates a flow diagram of an example current back-feed function (e.g., step 316). If the current back-feed function (e.g., step 316) is selected at step 314, the battery booster 100 may, via processor 128, open (or hold open) one or more switches to receive a back-feed current from vehicle 106 (e.g., the vehicle's 106 alternator coupled to the external battery 104), for example, using the pair of battery clamps 168 coupled to the DC booster output 136a via battery electrical conductors 166. In operation, at step 502, the processor 128 may selectively control (e.g., open or close) one or more switches in the power-management circuit 132 to receive the back-feed current from the DC booster output 136a and direct it to the internal power supply 158.

At step 504, the processor 128 may regulated the back-feed current. For example, the battery booster 100 may, via processor 128, open and close the battery switches 190 at a predetermined frequency to achieve a duty cycle that provides a desired regulated back-feed current from the internal battery 160 to an external battery 104 that is electrically coupled to the DC booster output 136a. For example, a pulse width modulation (PWM) driver 110 may be used to control the duty cycle. In other aspects, the battery switches 190 may be fully closed for a predetermined period of time to couple the internal battery 160 directly to the DC booster output 136a, thereby absorbing current. The predetermined period of time may be, for example, up to 60 seconds, up to 30 seconds, or up to 15 seconds.

The back-feed current, whether regulated or not, may be provided to the internal battery 160 until a predetermined booster condition is met at step 506. If the condition is met (i.e., a threshold is met), the process proceeds to step 510, otherwise, the process may proceed to step 508. The condition may relate to a voltage of the internal battery 160, the amount of current (i.e., amperes) provided to the internal battery 160, a temperature of the internal battery 160, a time duration, etc. For example, the back-feed current may be provided to the internal battery 160 until a predetermined threshold voltage, threshold temperature, threshold amperes, or time has elapsed. Another advantage of providing the back-feed current to the battery booster 100 is that the internal power supply 158 can be charged, thereby reducing the amount of time needed to recharge the internal power supply 158 using other means.

If the condition is met at step 506, the battery booster 100 may indicate that the back-feed function is completed at step 510. The indication may aural or visual and be provided via, for example, a display device 114, a speaker 124, or another device (e.g., a portable electronic device 152) via a communication network 170. The process may then proceed to step 318, where the battery booster 100 may, via processor 128, open the one or more switches to discontinue supply of the jump-start current to the external battery 104.

If the condition is not met at step 506, the battery booster 100 may determine whether a timeout condition exists at step 508. For example, the power-management circuit 132 may be configured to pass the back-feed current from the internal power supply 158 to the DC booster output 136*a* for only a predetermined amount of time. The predetermined amount of time may be, for example, 1 second to 300 seconds, 2 seconds to 150 seconds, 2 seconds to 60 seconds, or 2 seconds to 30 seconds. If the predetermined amount of time has not yet elapsed at step 508, the process may return to step 502. If the predetermined amount of time has elapsed at step 508, the process may proceed to step 512.

At step 512, the battery booster 100 may indicate that the back-feed function has failed. The indication may aural or visual and be provided via, for example, a display device 114, a speaker 124, or another device (e.g., a portable electronic device 152) via a communication network 170. The process may then proceed to step 318, where the battery booster 100 may, via processor 128, open the one or more switches to discontinue supply of the jump-start current to the external battery 104.

The above-cited patents and patent publications are hereby incorporated by reference in their entirety. Although various embodiments have been described with reference to a particular arrangement of parts, features, and the like, these are not intended to exhaust all possible arrangements or features, and indeed many other embodiments, modifications, and variations will be ascertainable to those of skill in the art. Thus, it is to be understood that the invention may therefore be practiced otherwise than as specifically described above.

What is claimed is:

1. A battery booster for jumpstarting a vehicle having an external battery with a nominal voltage of 12 volts, the battery booster comprising:
    at least one processor;
    a user interface;
    a set of terminal connectors configured to couple with the external battery or an engine that is electrically coupled with the external battery;
    a power supply having a lithium battery configured to supply a pre-charge current to pre-charge the external battery and a starting current to jump start the engine, wherein the lithium battery has a nominal voltage of 16 volts; and
    a power-management circuit that comprises a single-ended primary-inductor converter (SEPIC) circuit and that is operatively coupled with the at least one processor,
        wherein the at least one processor is configured to transfer power selectively between the external battery and the power supply via a switch,
        wherein the at least one processor is configured to close the switch to perform a pre-charge function via the power-management circuit whereby the pre-charge current is supplied to the external battery for a first predetermined period of time before the at least one processor opens the switch,
        wherein the at least one processor is configured to detect an ignition attempt,
        wherein the at least one processor is configured to, upon detection of the ignition attempt, close the switch to supply the starting current via the power-management circuit to jump start the engine,
        wherein the at least one processor is configured to detect a spike,
        wherein, upon detection of the spike, the at least one processor is configured to perform a back-feed function via the power-management circuit to pass a back-feed current from the vehicle to the lithium battery via the SEPIC circuit for a second predetermined period of time, and
        wherein the power-management circuit further comprises a pulse width modulation (PWM) driver operatively coupled to one or more switches, the at least one processor is configured to, during the back-feed function, modulate the back-feed current from the vehicle via the PWM driver and one or more switches.

2. The battery booster of claim 1, wherein the at least one processor, via the user interface, is configured to enable a user to selectively enable or disable the back-feed function for the second predetermined period of time.

3. The battery booster of claim 1, wherein the spike is a voltage spike.

4. The battery booster of claim 1, wherein the spike is a current spike.

5. The battery booster of claim 1, wherein the power supply further comprises a supercapacitor that is coupled to the lithium battery in parallel.

6. A battery booster for jumpstarting a vehicle having an external battery, the battery booster comprising:
    at least one processor;
    a user interface;
    a set of terminal connectors configured to couple with the external battery or an engine that is electrically coupled with the external battery, wherein the external battery has a first nominal voltage;
    a power supply having a lithium battery configured to supply a pre-charge current to pre-charge the external battery and a starting current to jump start the engine, wherein the lithium battery has a second nominal voltage that is 20% to 40% greater than the first nominal voltage; and
    a power-management circuit operatively coupled with the at least one processor, wherein the at least one processor is configured to transfer power selectively between the external battery and the power supply via a switch, wherein the at least one processor is configured to close the switch to perform a pre-charge function via the power-management circuit whereby the pre-charge current is supplied to the external battery for a first predetermined period of time before the at least one processor opens the switch, wherein the at least one processor is configured to detect an ignition attempt, and wherein the at least one processor is configured to, upon detection of the ignition attempt close the switch to supply the starting current via the power-management circuit to jump start the engine.

7. The battery booster of claim 6, wherein the first nominal voltage is 12 volts and the second nominal voltage is 16 volts.

8. The battery booster of claim 6, wherein the at least one processor is configured to detect a spike.

9. The battery booster of claim 8, wherein, upon detection of the spike, the at least one processor is configured to perform a back-feed function via the power-management circuit to pass a back-feed current from the vehicle to the lithium battery via a single-ended primary-inductor converter (SEPIC) circuit for a second predetermined period of time.

10. The battery booster of claim 9, wherein the at least one processor, via the user interface, is configured to enable a user to selectively enable or disable the back-feed function for the second predetermined period of time.

11. The battery booster of claim 9, wherein the at least one processor is configured to, during the back-feed function, pass a back-feed current from the vehicle to the lithium battery via the power-management circuit until a voltage of the lithium battery meets a predetermined threshold voltage.

12. The battery booster of claim 9, wherein the power-management circuit comprises a pulse width modulation (PWM) driver operatively coupled to one or more switches, wherein the at least one processor is configured to, during the back-feed function, modulate the back-feed current via the PWM driver and one or more switches.

13. The battery booster of claim 6, wherein the power supply further comprises a supercapacitor that is configured to draw a charging current from the external battery via the set of terminal connectors before the power-management circuit provides the starting current to the external battery.

14. The battery booster of claim 6, wherein the processor is configured to detect a drop in current across the set of terminal connectors and the power-management circuit is configured to provide the starting current in response to the processor detecting the drop in current across the set of terminal connectors.

15. A battery booster for jumpstarting a vehicle having an external battery, the battery booster comprising:
at least one processor;
a user interface;
a set of terminal connectors configured to couple with the external battery or an engine that is electrically coupled with the external battery, wherein the external battery has a first nominal voltage;
a power supply having a lithium battery configured to supply a pre-charge current to pre-charge the external battery and a starting current to jump start the engine, wherein the lithium battery has a second nominal voltage that is at least 20% greater than the first nominal voltage; and
a power-management circuit operatively coupled with the at least one processor,
wherein the at least one processor is configured to transfer power selectively between the external battery and the power supply via a switch,
wherein the at least one processor is configured to close the switch to perform a pre-charge function via the power-management circuit to pass a charging current from the lithium battery to the external battery until a voltage of the external battery meets a predetermined threshold voltage,
wherein the at least one processor is configured to detect an ignition condition,
wherein the at least one processor is configured to, upon detection of the ignition condition, close the switch to supply the starting current via the power-management circuit to jump start the engine,
wherein the at least one processor is configured to detect a spike, and
wherein, upon detection of the spike, the at least one processor is configured to perform a back-feed function via a single-ended primary-inductor converter (SEPIC) circuit to pass a back-feed current from the vehicle to the lithium battery via the power-management circuit for a second predetermined period of time.

16. The battery booster of claim 15, wherein the at least one processor, via the user interface, is configured to enable a user to selectively enable or disable the back-feed function for the second predetermined period of time.

17. The battery booster of claim 15, wherein the first nominal voltage is 12 volts and the second nominal voltage is 16 volts.

18. The battery booster of claim 15, wherein the power-management circuit comprises a pulse width modulation (PWM) driver operatively coupled to one or more switches, the at least one processor is configured to, during the back-feed function, modulate the back-feed current from the vehicle via the PWM driver and one or more switches.

19. The battery booster of claim 15, wherein the at least one processor is configured to, during the back-feed function, pass the back-feed current from the vehicle to the lithium battery via the power-management circuit until a voltage of the lithium battery meets a predetermined threshold voltage.

20. The battery booster of claim 1, wherein the starting current is greater than the pre-charge current.

21. The battery booster of claim 1, wherein the at least one processor is configured to detect the ignition attempt by monitoring for a voltage drop across the set of terminal connectors.

* * * * *